US010679661B2

(12) United States Patent
Kobayashi et al.

(10) Patent No.: US 10,679,661 B2
(45) Date of Patent: Jun. 9, 2020

(54) INFORMATION PROCESSING DEVICE AND METHOD OF DATA REPRODUCTION

(71) Applicant: SONY CORPORATION, Tokyo (JP)

(72) Inventors: Yoshiyuki Kobayashi, Tokyo (JP); Kouichi Uchimura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 220 days.

(21) Appl. No.: 15/542,148

(22) PCT Filed: Dec. 3, 2015

(86) PCT No.: PCT/JP2015/083972
§ 371 (c)(1),
(2) Date: Jul. 7, 2017

(87) PCT Pub. No.: WO2016/117229
PCT Pub. Date: Jul. 28, 2016

(65) Prior Publication Data
US 2018/0268854 A1 Sep. 20, 2018

(30) Foreign Application Priority Data

Jan. 22, 2015 (JP) ................................. 2015-010471

(51) Int. Cl.
G06F 16/18 (2019.01)
G11B 7/007 (2006.01)
(Continued)

(52) U.S. Cl.
CPC .......... G11B 7/0079 (2013.01); G06F 16/188 (2019.01); G06F 16/258 (2019.01);
(Continued)

(58) Field of Classification Search
CPC ...... G06F 16/188; G06F 16/258; G06F 21/10; G11B 7/0079; H04L 9/3263
See application file for complete search history.

(56) References Cited

U.S. PATENT DOCUMENTS

2009/0003172 A1* 1/2009 Yahata .................. G11B 19/10
369/53.41
2009/0222674 A1* 9/2009 Leichsenring .......... G06F 21/51
713/193
(Continued)

FOREIGN PATENT DOCUMENTS

BR PI0605904 A 12/2007
CN 101019106 A 8/2007
(Continued)

OTHER PUBLICATIONS

International Search Report and Written Opinion of PCT Application No. PCT/JP2015/083972, dated Feb. 23, 2016, 2 pages of English Translation and 7 pages of ISRWO.
(Continued)

Primary Examiner — Harunur Rashid
(74) Attorney, Agent, or Firm — Chip Law Group

(57) ABSTRACT

A virtual file system (VFS) is constructed by reliably acquiring subsequent data corresponding to an information recording medium from a local storage unit, and thus, data reproduction is executed. A data processing unit executes processing of selecting data associated with the information recording medium from the local storage unit, as reproduction target data, executes directory name calculation processing in which a conversion function corresponding to a version of the information recording medium is applied to configuration data of a root certificate recorded in the information recording medium, at the time of performing the processing of selecting the reproduction target data, and selects data which is recorded in a directory having a calculated directory name from the local storage unit, as the reproduction target data.

10 Claims, 22 Drawing Sheets

(51) Int. Cl.
*G06F 16/188* (2019.01)
*G06F 16/25* (2019.01)
*G11B 20/12* (2006.01)
*G11B 20/10* (2006.01)
*G11B 20/00* (2006.01)
*G11B 27/19* (2006.01)
*H04L 9/32* (2006.01)
*H04N 21/433* (2011.01)

(52) U.S. Cl.
CPC ........ *G11B 20/00086* (2013.01); *G11B 20/10* (2013.01); *G11B 20/1217* (2013.01); *G11B 27/19* (2013.01); *H04L 9/3263* (2013.01); *G11B 20/00217* (2013.01); *H04N 21/433* (2013.01)

(56) References Cited

U.S. PATENT DOCUMENTS

| | | | | |
|---|---|---|---|---|
| 2010/0049992 | A1* | 2/2010 | Leichsenring | G06F 21/51 713/193 |
| 2010/0061702 | A1* | 3/2010 | Tanaka | G11B 27/329 386/241 |
| 2012/0265985 | A1* | 10/2012 | Leichsenring | G06F 21/51 713/157 |

FOREIGN PATENT DOCUMENTS

| | | | |
|---|---|---|---|
| CN | 101789065 | A | 7/2010 |
| CN | 101853221 | A | 10/2010 |
| CN | 101853340 | A | 10/2010 |
| CN | 101853353 | A | 10/2010 |
| CN | 101853354 | A | 10/2010 |
| CN | 101853355 | A | 10/2010 |
| CN | 101853356 | A | 10/2010 |
| EP | 1818833 | * | 2/2006 ............. G06F 12/14 |
| EP | 1818833 | A1 | 8/2007 |
| EP | 2166474 | A2 | 3/2010 |
| JP | 2003-140662 | A | 5/2003 |
| JP | 2006-085647 | A | 3/2006 |
| JP | 2006-100879 | A | 4/2006 |
| JP | 2007-01210 | A | 1/2007 |
| JP | 3959735 | B2 | 8/2007 |
| JP | 2008-132772 | A | 6/2008 |
| JP | 2009-301562 | A | 12/2009 |
| JP | 2010-033592 | A | 2/2010 |
| JP | 2010-160808 | A | 7/2010 |
| JP | 4806396 | B2 | 11/2011 |
| JP | 4870823 | B2 | 2/2012 |
| JP | 5020301 | B2 | 9/2012 |
| JP | 5065349 | B2 | 10/2012 |
| JP | 2013-03856 | A | 1/2013 |
| WO | 2006/085647 | A1 | 8/2006 |
| WO | 2006/100879 | A1 | 9/2006 |
| WO | 2008/132772 | A1 | 11/2008 |

OTHER PUBLICATIONS

Extended European Search Report of EP Patent Application No. 15878918.0, dated Jul. 25, 2018, 10 pages.

Office Action for JP Patent Application No. 2016-570505, dated Apr. 2, 2019, 4 pages of Office Action and 4 pages of English Translation.

* cited by examiner

FIG. 5

| | ACCESS FILE NAME APPLIED TO FILE ACCESS OF LOCAL STORAGE UNIT |
|---|---|
| (1) | BUDA/h(A)/a11/PLAYLIST0001.pls |
| (2) | BUDA/h(A)/a11/CLIPINF0001.clpi |
| (3) | BUDA/h(A)/a11/AVSTREAM0001.m2ts |
| ... | ... |

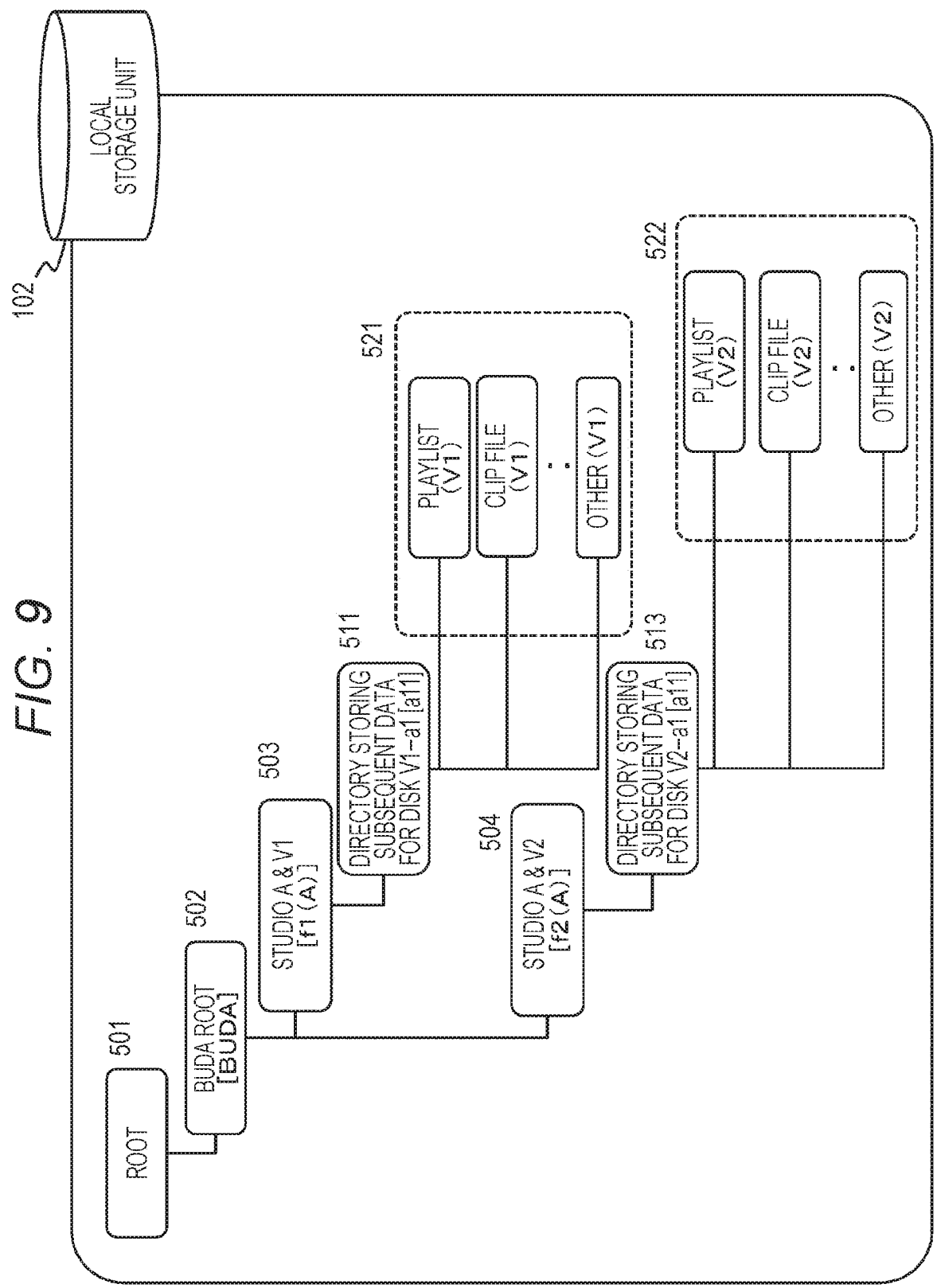

FIG. 10

| | f1 | f2 | NOTE |
|---|---|---|---|
| (1) | CONVERSION FUNCTION: f1 IS APPLIED ONCE<br>f1(A)<br><br>(EXAMPLE) HASH FUNCTION: h1 IS APPLIED ONCE<br>f1(A) = h1(A) | CONVERSION FUNCTION: f1 IS APPLIED TWICE<br>f2(A) = f1(f1(A))<br><br>(EXAMPLE) HASH FUNCTION: h1 IS APPLIED TWICE<br>f2(A) = h1(h1(A)) | FOR EXAMPLE<br>h1 = SHA−1<br>h1 = SHA−256 |
| (2) | CONVERSION FUNCTION: f1 IS APPLIED<br>f1(A)<br><br>(EXAMPLE) HASH FUNCTION: h1 IS APPLIED<br>f1(A) = h1(A) | CONVERSION FUNCTION: f2 IS APPLIED (f1 ≠ f2)<br>f2(A)<br><br>(EXAMPLE) HASH FUNCTION: h2 IS APPLIED<br>f2(A) = h2(A) | FOR EXAMPLE<br>h1 = SHA−1<br>h2 = SHA−256 |
| (3) | CONVERSION FUNCTION: f1 IS APPLIED<br>f1(A)<br><br>(EXAMPLE) HASH FUNCTION: h1 IS APPLIED<br>f1(A) = h1(A) | CONVERSION FUNCTION: CONCATENATE RESULTS OF f1<br>f2(A) = f1(A) ∥ f1(A)<br><br>(EXAMPLE) HASH FUNCTION: h1 IS APPLIED<br>f2(A) = h1(A) ∥ h1(A) | FOR EXAMPLE<br>h1 = SHA−1<br>h1 = SHA−256 |

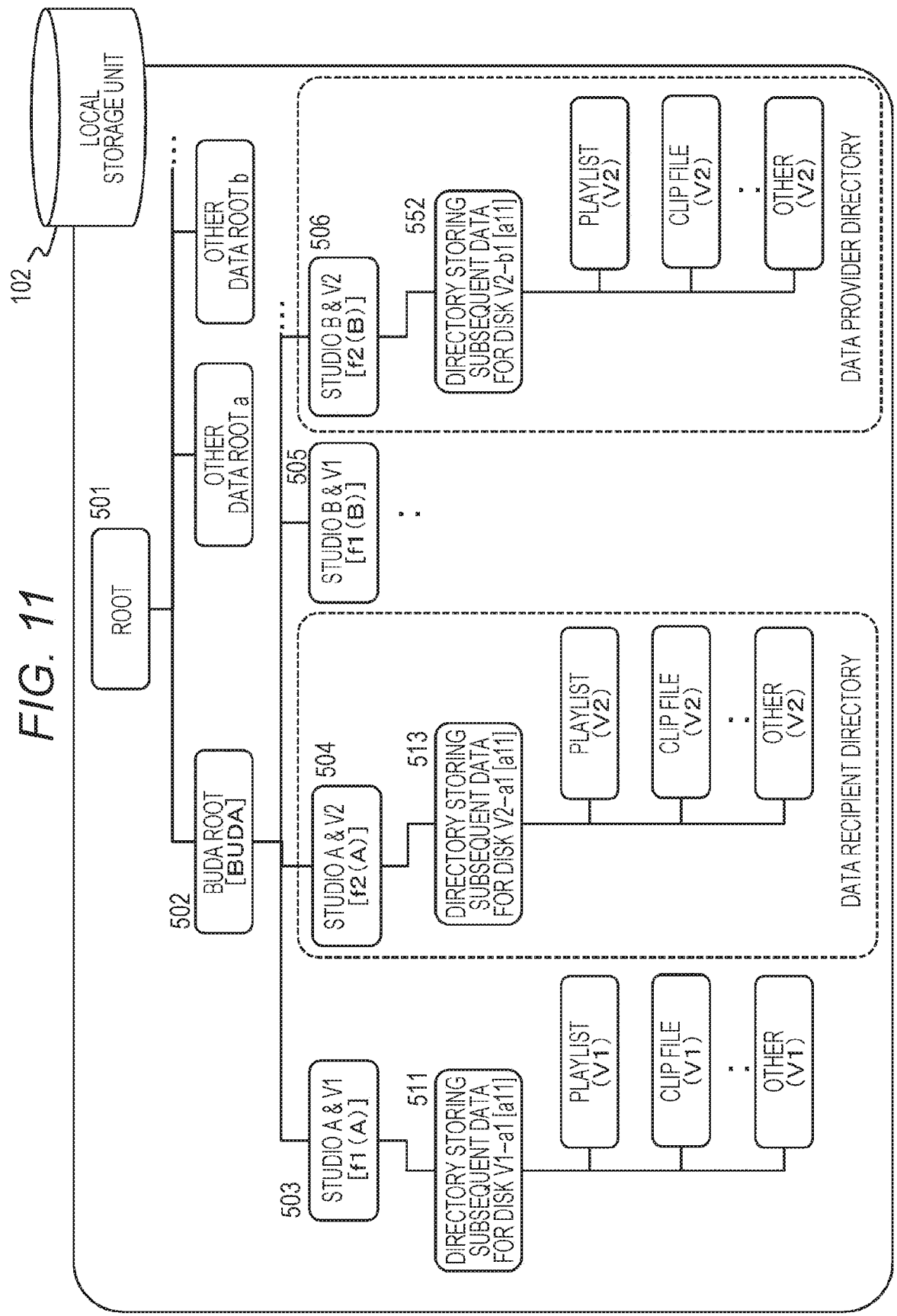

FIG. 12

DATA ACCESS PERMISSION INFORMATION [CORRESPONDING TO VERSION 2 (V2)]

| DATA RECIPIENT ID (EXAMPLE: STUDIO A-ID) |
| DATA RECIPIENT ID (EXAMPLE: STUDIO B-ID) |
| DATA RECIPIENT DIRECTORY IDENTIFIER (EXAMPLE, f2(A)) |
| DATA PROVIDER DIRECTORY IDENTIFIER (EXAMPLE, f2(B)) |
| PROVIDED DATA FILE LIST |
| : |
| ISSUER SIGNATURE |

FIG. 14

| DATA ACCESS PERMISSION INFORMATION [CORRESPONDING TO VERSION 1 (V1)] |
|---|
| DATA RECIPIENT ID (EXAMPLE: STUDIO A-ID) |
| DATA RECIPIENT ID (EXAMPLE: STUDIO B-ID) |
| DATA RECIPIENT DIRECTORY IDENTIFIER (EXAMPLE, f1(A)) |
| DATA PROVIDER DIRECTORY IDENTIFIER (EXAMPLE, f1(B)) |
| PROVIDED DATA FILE LIST |
| : |
| ISSUER SIGNATURE |

INFORMATION PROCESSING DEVICE AND METHOD OF DATA REPRODUCTION

CROSS REFERENCE TO RELATED APPLICATIONS

This application is a U.S. National Phase of International Patent Application No. PCT/JP2015/083972 filed on Dec. 3, 2015, which claims priority benefit of Japanese Patent Application No. JP 2015-010471 filed in the Japan Patent Office on Jan. 22, 2015. Each of the above-referenced applications is hereby incorporated herein by reference in its entirety.

TECHNICAL FIELD

The present disclosure relates to an information processing device, an information recording medium, and an information processing method, and a program. More specifically, the present disclosure relates to an information processing device that executes data reproduction processing using a plurality of different recording mediums, an information recording medium, and an information processing method, and a program.

BACKGROUND ART

Various software data items (hereinafter, referred to as contents) such as audio data such as music, image data such as video, a game program, and various application programs, can be stored in a recording medium, for example, a disk type information recording medium such as a Blu-ray (registered trademark) disc or a digital virsatile disc (DVD) or an information recording medium such as a flash memory.

A content storage medium, for example, is used for reproducing the content by being mounted on a reproducing device such as a personal computer (PC) or a player possessed by a user.

The reproducing device is capable of acquiring data (subsequent data) corresponding to a content recorded in an information recording medium which is mounted on the reproducing device, from a server. For example, in a case where the content recorded in the information recording medium is a video content, a content (subsequent data) such as various moving images and static images, for example, subtitle data or dubbed data corresponding to the video content, and service data corresponding to the content, preview, advertising, and the like, are acquired from the server.

The reproducing device such as a PC or a disk player, for example, stores the subsequent data acquired from the server in a hard disk which is embedded in the reproducing device.

When the reproducing device reproduces the content recorded in the information recording medium which is mounted on the reproducing device, it is possible to read out subsequent data corresponding to the mounted medium from the hard disk and to reproduce the subsequent data along with the content stored in the medium.

Furthermore, a content using system where the subsequent data is acquired from the server or the like, is recorded in a local storage unit of a user device, such as a hard disk, and is reproduced along with the content recorded in the disk, for example, is disclosed in Patent Document 1 (Japanese Patent No. 3959735) or Patent Document (Japanese Patent Application Laid-Open No. 2003-140662).

For example, when the content recorded in the disk such as a Blu-ray (registered trademark) disc, and the subsequent data recorded in the local storage unit such as the hard disk are reproduced together in the user device, a package virtual package is set in which the content stored in the disk and the content stored in the local storage unit such as the hard disk are integrated, a virtual file system (VFS) is constructed, and reproduction processing is performed. According to the reproduction processing based on the VFS, it is possible to perform reproduction similar to reproduction processing performed as if from one medium.

The number of subsequent data items is not limited to one with respect to one disk. That is, various subsequent data items are sequentially provided from the server. For example, various subsequent data items such as preview information with respect to a video content stored on one disk, advertising information of a company A, and advertising information of a company B are sequentially provided from the server.

In addition, various disks are mounted on the user device, and the subsequent data corresponding to each of the mounted disks is acquired from the server, and is stored in the local storage unit of the user device, such as the hard disk.

A subsequent data recording area of each of the disks, corresponding to each of the disks, is set in the local storage unit, and the subsequent data corresponding to each of the disks is recorded in the subsequent data recording area of each of the disks.

That is, a directory in the disk unit is set in the local storage unit of the user device, and the subsequent data corresponding to each of the disks is recorded within the directory in the disk unit.

In a case where the disk is mounted, the user device constructs the virtual file system (VFS) for selectively acquiring data within the directory where the subsequent data corresponding to the disk is recorded, and performs reproduction processing.

In order to perform such processing, the user device is required to specify the directory where the subsequent data corresponding to the disk mounted on the user device is stored.

For example, a directory name of the directory in which the subsequent data corresponding to the disk is recorded is acquired, the directory having the acquired directory name is extracted, and virtual file system (VFS) construction processing is executed.

Patent Document 3 (Japanese Patent No. 4806396) is provided as the related art disclosing such processing of acquiring the directory corresponding to the disk.

In Patent Document 3, a configuration is disclosed in which a hash value is calculated from a disk root certificate which is recorded in the disk mounted on the user device, that is, a root certificate which is a public key certificate corresponding to a content producer, a directory name corresponding to the calculated hash value is retrieved from the local storage unit, data within the directory is determined as the subsequent data recording area corresponding to the mounted disk, and the virtual file system (VFS) is constructed.

However, recently, for example, the use of an ultra high definition (UHD) image content such as a 4K content or an 8K content has increased, in addition to the use of a currently prevailing high definition (HD) image content.

Hereafter, it is expected that a situation in which the HD image content and the UHD image content are used together continues for a while.

The HD content and the UHD content, for example are different in an encoding (codec) aspect or the like, and a reproducing device corresponding to UHD and a display corresponding to UHD are required in order to reproduce and display a UHD image.

A lot of currently prevailing user devices such as a reproducing device or a display correspond to the HD content, but a user device (a reproducing device/a display) corresponding to UHD is still uncommon.

Accordingly, it is expected that a content making company, for example, makes both of the HD content and the UHD content with respect to the same video content, and supplies both of a disk storing the HD content and a disk storing the UHD content to the user.

In this case, even in the subsequent data described above, it is necessary that subsequent data corresponding to HD and subsequent data corresponding to UHD are made, and the reproducing device of the user acquires the subsequent data corresponding to HD or the subsequent data corresponding to UHD according to a user usage content from the server, and stores the subsequent data in the local storage unit of the user device.

However, in this case, in a case where the configuration of Patent Document 3 described above is applied, the following problems occur at the time of performing processing of acquiring the subsequent data corresponding to the mounted disk.

That is, a content producer of the subsequent data corresponding to the HD content is identical to a content producer of the subsequent data corresponding to UHD, and a disk root certificate which is stored in the disk storing the HD image content (a disk of a version 1) is identical to a disk root certificate which is stored in the disk storing the UHD image content (a disk of a version 2).

In this case, even in a case where the disk mounted on the reproducing device of the user is the disk storing the HD content (the disk of the version 1) or the disk storing the UHD content (the disk of the version 2), hash values which are calculated on the basis of the disk root certificate read out from the disks, are the same hash value.

Accordingly, in a case where the hash value calculated on the basis of the disk root certificate is set to the directory name of the directory of the local storage unit, in which the subsequent data is stored, a subsequent data storage area corresponding to an HD image is not capable of being distinguished from a subsequent data storage area corresponding to a UHD image.

As a result thereof, when the UHD image content is reproduced from the disk storing the UHD content (the disk of the version 2), there is a possibility that the reproducing device erroneously selects the HD image content from the local storage unit, as the subsequent data corresponding to the disk, and reproduces the HD image content.

In addition, in the case of a reproducing device which is not capable of reproducing the UHD image, or a reproducing device to which a display which is not capable of displaying the UHD image is connected, when the HD image content is reproduced from the disk storing the HD content (the disk of the version 1), there is also a possibility that the UHD image content is erroneously read out from the local storage unit, as the subsequent data corresponding to the disk, and thus, is not capable of being reproduced or displayed.

CITATION LIST

Patent Document

Patent Document 1: Japanese Patent No. 3959735
Patent Document 2: Japanese Patent Application Laid-Open No. 2003-140662
Patent Document 3: Japanese Patent No. 4806396

SUMMARY OF THE INVENTION

Problems to be Solved by the Invention

The present disclosure, for example, has been made in consideration of the problems described above, and an object of the present disclosure is to provide an information processing device which is capable of reliably acquiring data associated with a disk from data (subsequent data) stored in a local storage unit of a reproducing device of a user and of reproducing the data, an information recording medium, and an information processing method, and a program.

Solutions to Problems

A first aspect of the present disclosure lies in an information processing device, including:

a data processing unit configured to read out and reproduce data recorded in an information recording medium, and data stored in a local storage unit which is different from the information recording medium, wherein the data processing unit, executes processing of selecting data associated with the information recording medium from the local storage unit, as reproduction target data, executes directory name calculation processing in which a conversion function corresponding to a version of the information recording medium is applied to configuration data of a root certificate recorded in the information recording medium, at the time of performing the processing of selecting the reproduction target data, and selects data which is recorded in a directory having a calculated directory name from the local storage unit, as the reproduction target data.

Furthermore, a second aspect of the present disclosure lies in an information recording medium, which is a second information recording medium configuring a local storage unit storing subsequent data associated with a plurality of different first information recording mediums, wherein the subsequent data is recorded in a directory having a directory name which is generated by applying a conversion function corresponding to a version of the first information recording medium to root certificate configuration data corresponding to a content which is recorded in the first information recording medium associated with the subsequent data, and a reproducing device configured to execute reproduction processing with respect to data recorded in the first information recording medium is capable of selecting data recorded in a directory having a directory name which is calculated by applying the conversion function, as subsequent data of a reproduction target.

Furthermore, a third aspect of the present disclosure lies in an information recording medium, in which reproduction target data and data access permission information are recorded, wherein a directory name which is calculated by applying a conversion function corresponding to a version to configuration data of a root certificate of a data provider is recorded in the data access permission information, as a directory identifier, and a reproducing device configured to execute reproduction processing with respect to data recorded in the information recording medium, confirms whether or not the directory name which is calculated by applying the conversion function corresponding to the version to the configuration data of the root certificate of the data provider is coincident with the directory identifier which is recorded in the data access permission information, and is capable of selecting data which is recorded in a directory having a calculated directory name from a local storage unit different from the information recording medium, as reproduction target data, in a case where it is confirmed that the directory name is coincident with the directory identifier.

Furthermore, a fourth aspect of the present disclosure lies in an information processing method, which is executed in an information processing device, wherein the information processing device includes a data processing unit configured to read out and reproduce data recorded in an information recording medium, and data stored in a local storage unit which is different from the information recording medium, and the data processing unit, executes processing of selecting data associated with the information recording medium from the local storage unit, as reproduction target data, executes directory name calculation processing in which a conversion function corresponding to a version of the information recording medium is applied to configuration data of a root certificate recorded in the information recording medium, at the time of performing the processing of selecting the reproduction target data, and selects data which is recorded in a directory having a calculated directory name from the local storage unit, as the reproduction target data.

Furthermore, a fifth aspect of the present disclosure lies in a program, which allows information processing to be executed in an information processing device, wherein the information processing device includes a data processing unit configured to read out and reproduce data recorded in an information recording medium, and data stored in a local storage unit which is different from the information recording medium, and the program allows the data processing unit to execute processing of selecting data associated with the information recording medium from the local storage unit, as reproduction target data, execute directory name calculation processing in which a conversion function corresponding to a version of the information recording medium is applied to configuration data of a root certificate recorded in the information recording medium, at the time of performing the processing of selecting the reproduction target data, and execute processing of selecting data which is recorded in a directory having a calculated directory name from the local storage unit, as the reproduction target data.

Furthermore, the program of the present disclosure, for example, is a program which can be provided by a storage medium and a communication medium provided in a computer readable format, with respect to an information processing device, or a computer or a system in which various programs and codes can be executed. By providing such programs in the computer readable format, processing according to the program is realized on the information processing device, or the computer or the system.

Another object, another characteristic, or another advantage of the present disclosure will be obvious by the detailed description based on examples of the present disclosure described below or the attached drawings. Furthermore, herein, the system has a configuration in which a plurality of devices is logically set, and the device of each configuration is not limited to being in the same housing.

Effects of the Invention

According to the configuration of an example of the present disclosure, it is possible to reliably acquire the subsequent data corresponding to the information recording medium from the local storage unit, to construct the virtual file system (VFS), and to execute data reproduction.

Specifically, the data processing unit configured to read out and reproduce data recorded in the information recording medium, and the data stored in the local storage unit which is different from the information recording medium, is provided. The data processing unit executes the processing of selecting the data associated with the information recording medium from the local storage unit, as the reproduction target data, executes the directory name calculation processing in which the conversion function corresponding to the version of the information recording medium is applied to the configuration data of the root certificate recorded in the information recording medium, at the time of performing the processing of selecting the reproduction target data, and selects the data which is recorded in the directory having the calculated directory name from the local storage unit, as the reproduction target data.

According to this configuration, it is possible to reliably acquire the subsequent data corresponding to the information recording medium from the local storage unit, to construct the virtual file system (VFS), and to execute the data reproduction.

BRIEF DESCRIPTION OF DRAWINGS

FIG. 5 is a diagram illustrating access information (a path) which is applied to data acquisition processing of the reproducing device from the local storage unit.

FIG. 9 is a diagram illustrating a directory configuration example of the local storage unit which is capable of reliably acquiring the subsequent data corresponding to the disk.

FIG. 10 is a diagram illustrating an example of directory name generating function.

FIG. 11 is a diagram illustrating data in the local storage unit which can be used in a case where data access permission information is used.

FIG. 12 is a diagram illustrating a data configuration example of the data access permission information.

FIG. 14 is a diagram illustrating a data configuration example of the data access permission information.

MODE FOR CARRYING OUT THE INVENTION

Figure 1:
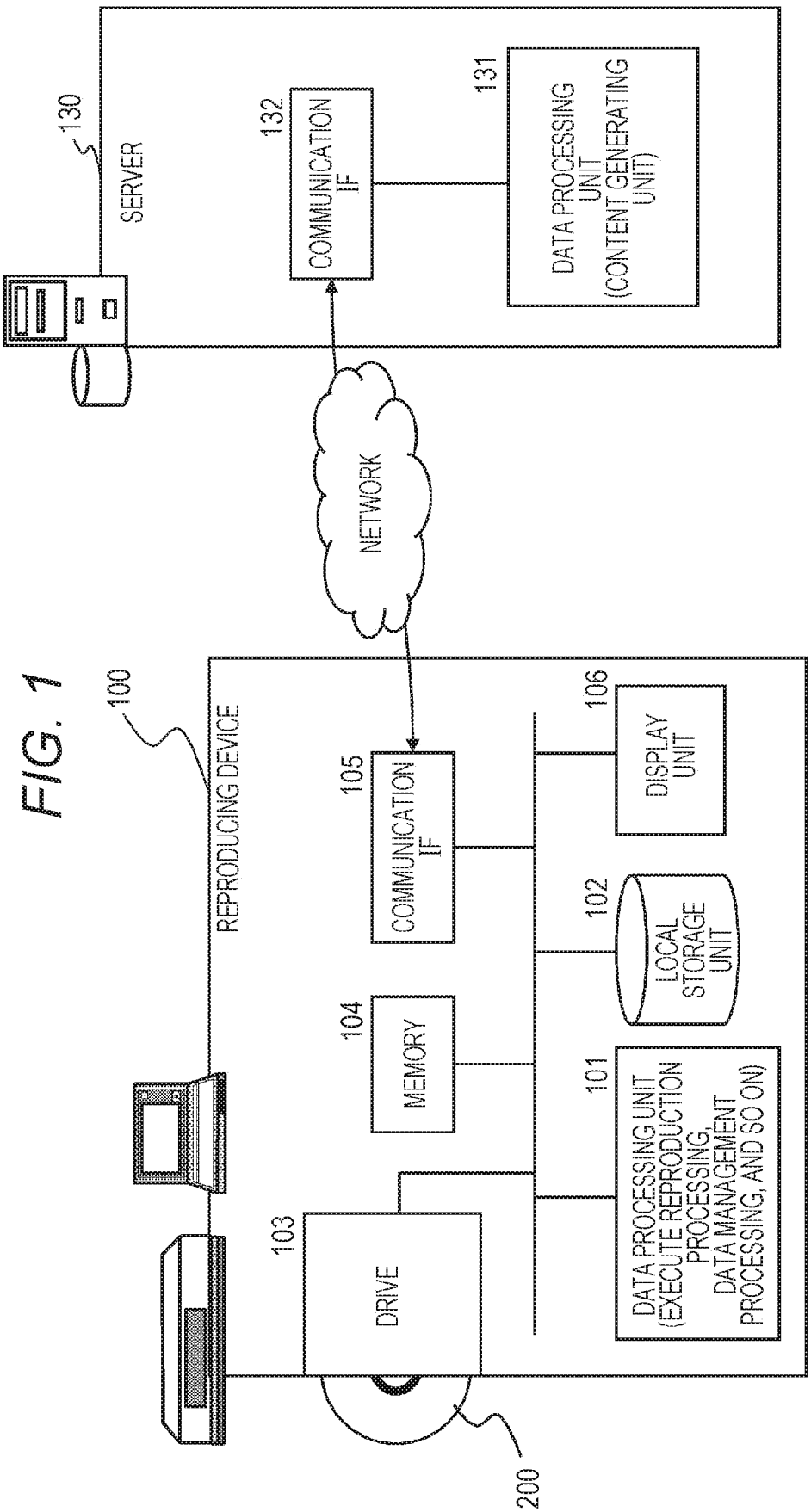
FIG. 1 is a diagram illustrating a configuration of a reproducing device and a configuration example of a server.

Hereinafter, an information processing device, an information recording medium, and an information processing method, and a program of the present disclosure will be described in detail with reference to the drawing. Furthermore, the description will be performed according to the following items.

1. Outline of Data Reproduction Processing Based on Construction of Virtual File System (VFS)
2. Data Storage Configuration in Local Storage Unit
3. Configuration Capable of Reliably Selecting Subsequent Data Corresponding to Disk
4. Configuration and Use Processing of Data Access Permission Information
5. Data Processing Sequence Executed in Reproducing Device
5-1. Processing Example 1: Reproduction Processing Example in Absence of Confirmation Processing of Data Access Permission Information
5-2. Processing Example 2: Reproduction Processing Example in Presence of Confirmation Processing of Data Access Permission Information
6. Hardware Configuration Example of Information Processing Device
7. Summary of Configuration of Present Disclosure 1. Outline of Data Reproduction Processing Based on Construction of Virtual File System (VFS)

First, the outline of data reproduction processing based on the construction of a virtual file system (VFS) will be described.

FIG. 1 illustrates a server 130, and a reproducing device 100 as a user device which receives data (subsequent data) provided from the server 130 and performs reproduction processing. The reproducing device 100, for example, reads out a content from an information recording medium such as a DVD or a Blu-ray (registered trademark) disc, or a flash memory, and reproduces the content. When the content reproduction is performed, the subsequent data which is acquired from the server 130 and is stored in a local storage unit 102 such as a hard disk, is also reproduced.

When the reproduction processing is performed, the reproducing device constructs a virtual file system (VFS) and performs the reproduction processing.

The reproducing device 100 has the following configuration.

The reproducing device 100 is configured of:

a data processing unit 101 having a program execution function, such as a CPU executing content reproduction processing, subsequent data management processing, and the like;

the local storage unit 102 storing the subsequent data such as data downloaded from the server 130 or data generated by a user, and management data, as data corresponding to a content stored in an information recording medium 200;

a drive 103 performing data input/output with respect to the information recording medium 200;

a memory 104 configured of a ROM and a RAM which are used in a program execution area, a parameter storage area, and the like;

a communication interface 105 executing communication through a network, and a display unit 106 displaying a content or content information.

The local storage unit 102, for example, is configured of a hard disk, a flash memory, or the like.

The reproducing device 100 reads the content stored in the information recording medium 200 from the information recording medium 200 through the drive 103, and performs the reproduction processing with respect to the content. The processing is performed under control of the data processing unit 101. The information recording medium 200, for example, is a ROM disk or the like, in which the content is recorded in advance.

Furthermore, in examples described below, a storage medium used in the reproducing device 100 is set as follow.

A Blu-ray (registered trademark) disc (=the information recording medium 200) is used as a content storage medium, and a hard disk is used as the local storage unit 102 which becomes a storage area of the subsequent data acquired from the server 130.

Here, the processing of the present disclosure is not limited to a combination of such mediums, and can be applied to various combinations, for example, a case where a flash memory or the like is used as a medium.

The reproducing device 100 acquires the subsequent data which can be used together for reproducing the content stored in the information recording medium 200, from the server 130, and stores the subsequent data in the local storage unit 102 configured, for example, of a hard disk. The subsequent data acquired from the server 130, for example, is data such as various moving images and static images, for example, subtitle data or dubbed data in a case where the content stored in the information recording medium 200 is a video content, and service data corresponding to the content stored in the information recording medium 200, preview, advertising, and the like. In addition, in a case where the content stored in the information recording medium 200 is a game program or the like, subsequent data obtained by executing a game, such as score information and progress information, is stored in the local storage unit 102.

The subsequent data stored in the local storage unit 102, for example, is data acquired or generated corresponding to any one of the contents stored in the information recording medium 200, and when the reproduction processing is performed with respect to the content stored in the information recording medium 200, the subsequent data which is stored in the local storage unit 102 and is selected by the user, can be reproduced together. In the reproduction processing, for example, a package (a virtual package) is set in which a content stored in a disk, and a content stored in the local storage unit such as a hard disk are integrated, a virtual file system (VFS) is constructed, and the reproduction processing is performed. According to the reproduction processing based on the VFS, it is possible to perform reproduction similar to reproduction processing performed as if from one medium. The details of the reproduction processing based on the VFS will be described below.

When the subsequent data is recorded, the data processing unit 101, as necessary, generates or updates management information or explanatory information relevant to the subsequent data, and records the data in the local storage unit 102. The data processing unit 101 records the subsequent data, the management information, and the explanatory information in a directory for subsequent data, which is set in the local storage unit 102.

The data processing unit 101 manages a data group used for configuring the virtual file system (VFS), which is stored in the local storage unit 102, in management unit which is also referred to as binding unit (BU). The management unit (BU) is set as subsequent data which is subsequently generated or acquired corresponding to the content stored in the information recording medium 200, for example, a unit including a content downloaded from the server or data generated by the user.

A storage area of the binding unit (BU) in the local storage unit 102 is referred to as a binding unit data area (BUDA).

When the content stored in the information recording medium (disk) 200 and the subsequent data stored in the local storage unit 102 are reproduced together, as described above, the data processing unit 101 constructs the virtual file system (VFS) and performs the reproduction processing, and at this time, performs file name conversion processing with respect to the subsequent data stored in the local storage unit 102. A table applied to the conversion processing is referred to as a file name conversion table (a manifest file (MF)). Subsequent data management information is recorded in the manifest file in the management unit (the binding unit (BU)), and the manifest file is also referred to as a binding unit manifest file (BUMF).

The server 130 illustrated in FIG. 1 provides the data (the subsequent data) to the reproducing device 100. The server 130 includes a data processing unit 131 generating the data (the subsequent data) which is reproduced by the reproducing device 100, and a communication IF 132, which is a communication unit transmitting the data generated by the data processing unit 131 to the reproducing device.

The data processing unit 131 of the server 130 generates the subsequent data which can be reproduced by applying the virtual file system (VFS) constructed by the reproducing device 100. The generated data is provided to the reproducing device 100 through the communication IF 132.

Figure 2:
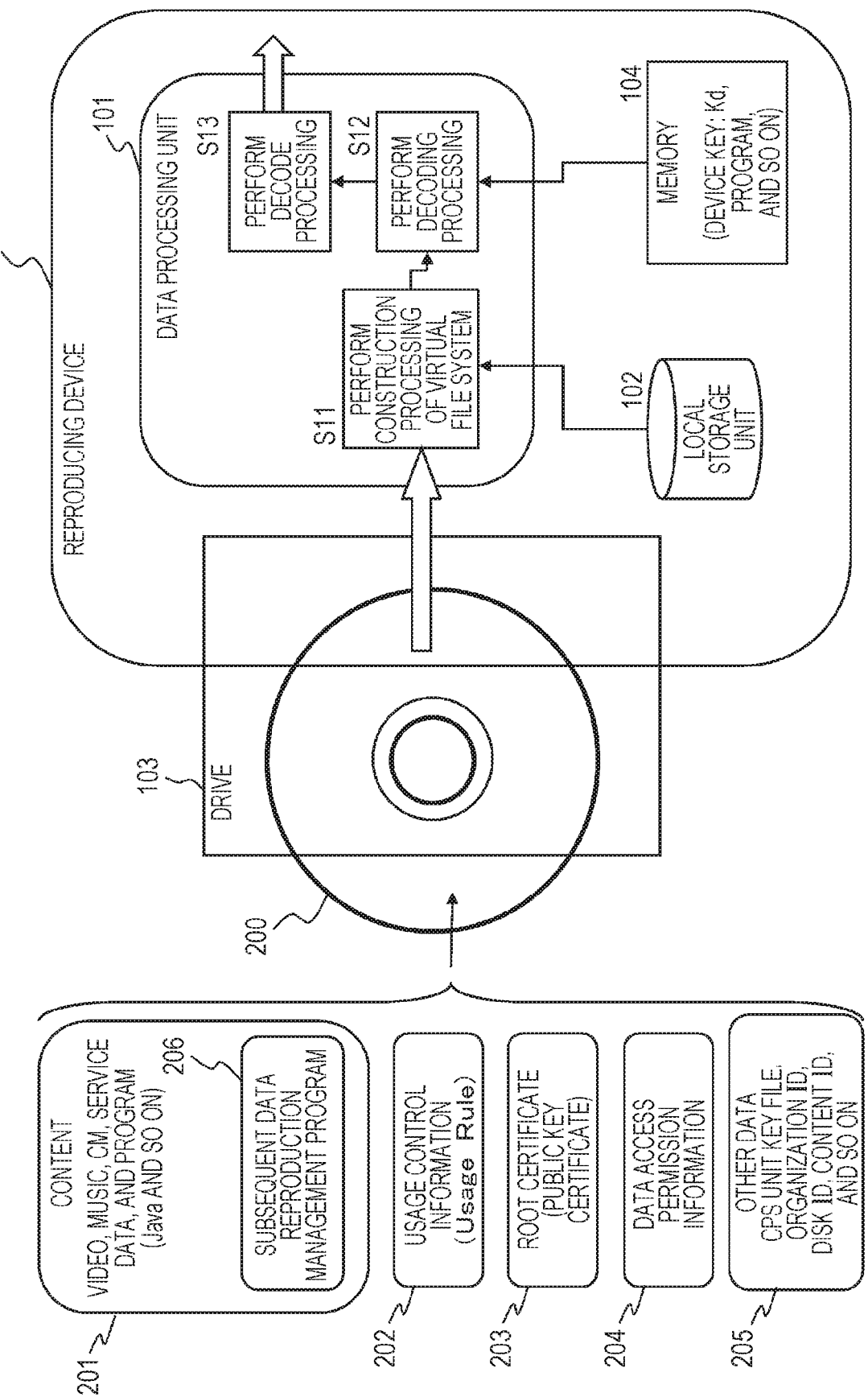
FIG. 2 is a diagram illustrating data stored in an information recording medium and processing of the reproducing device.

Next, an example of the data stored in the information recording medium and an example of the content reproduction processing of the information processing device will be described with reference to FIG. 2 and FIG. 3. FIG. 2 is a diagram illustrating examples of the data stored in the information recording medium 200 and the content reproduction processing of the reproducing device 100. Here, an example of information storage of a ROM disk as a disk, in which a content has been stored is illustrated. The reproducing device 100, for example, is various reproducing devices such as a PC or a disk player, and includes the drive 103 which executes reading processing with respect to the data from the information recording medium 200.

The ROM disk as the information recording medium (disk) 200, for example, is an information recording medium such as a Blu-ray (registered trademark) disc or a DVD, and for example, is an information recording medium storing a legitimate content which is manufactured in a disk manufacturing plant with the permission of a legitimate content right holder.

As illustrated in FIG. 2, data such as:
a content 201;
usage control information (Usage Rule) 202;
a root certificate (a public key certificate of a content producer) 203;
data access permission information 204; and
other data 205,
is recorded in the information recording medium (disk) 200.

Furthermore, in this example, an example is described in which a subsequent data reproduction management program 206 is included in the content 201 as program information applied to the content download processing from the server 130 described below. The subsequent data reproduction management program, for example, is a program configured of a Java (registered trademark) application, and is also referred to as a BD-J app. Hereinafter, the outline of the information stored in the information recording medium 200 will be described.

(1) Content 201

Various contents are stored in the information recording medium (disk) 200. For example, various contents are contents such as an audio visual (AV) stream or a game program, an image file, audio data, text data, Java (registered trademark) application program, and the like of a moving image content such as an HD image or a UHD image content.

For example, the Java (registered trademark) application program, the game program, the image file, the audio data, the text data, and the like are stored in the content 201 as a sub-content.

The type of content includes various contents such as music data, image data such as a moving image and a static image, a game program, and a WEB content along with a main content and the sub-content, and the contents include various information items such as content information which can be used by only the data from the information recording medium 200, and content information which can be used together with the data from the information recording medium 200 and the data provided from the server connected to a network.

(2) Usage Control Information (Usage Rule) 202

For example, copy and reproduction control information (CCI) is included in the usage control information (Usage Rule) 202. That is, the copy and reproduction control information (CCI) is the copy control information or reproduction control information for performing usage control corresponding to an encryption content 201 stored in the information recording medium 200, the content which is subsequently acquired from the server, or the like. The copy and reproduction control information (CCI) can be variously set such that copy and reproduction control information (CCI) is set as information of each CPS unit which is set as a content management unit or is set corresponding to a plurality of CPS units.

(3) Root Certificate (Public Key Certificate of Content Producer) 203

The root certificate 203 is a public key certificate of a maker of the content 201 such as video which is stored in the information recording medium (disk) 200. Furthermore, in the following description, examples of a content producer, includes:

a studio A;
a studio B; and
a studio C.

That is, each of the studios A, B, C, and the like is the content producer.

The root certificate 203 is a public key certificate storing a public key of each of the studios A, B, C, and the like, and is provided with a signature of a public key certificate issuer (a certificate authority).

The root certificate 203 has a configuration which can be subjected to legitimacy confirmation, that is, alteration verification by signature verification processing.

(4) Data Access Permission Information 204

The data access permission information 204 is a certificate in which access permission information of the data (the subsequent data) which is stored in the local storage unit 102 of the reproducing device 100 is recorded.

In general, data can be read from only one subsequent data recording area stored in the local storage unit 102, corresponding to the disk mounted on the reproducing device 100, and there is a case where subsequent data recorded in a subsequent data recording area corresponding to the other disk which does not correspond to the mounted disk is used.

In such a case, the data access permission information 204 is recorded in the disk.

The reproducing device is capable of acquiring the data from the subsequent data recording area corresponding to the other disk to which access is permitted, other than the subsequent data corresponding to the mounted disk, and of using the data, with reference to the data access permission information 204.

The detailed configuration and the detailed use processing of the data access permission information 204 will be described below.

(5) Other Data 205

The other data 205, for example, includes the following data such as:

a CPS unit key file storing a CPS unit key which is key data applied to the decoding of the content 201;
an organization ID as a studio identifier;
a disk ID as a disk identifier; and
a content ID as a content identifier.

The encryption content stored in the information recording medium 200 is sorted by the CPS unit which is set as the content management unit, and is encrypted by applying an encryption key in the unit. The reproducing device executing the reproduction processing determines a CPS unit to which a content which is a reproduction target belongs, and performs decoding processing to which the CPS unit key as an encryption key corresponding to the determined CPS unit is applied. A file storing data which is required for acquiring the CPS unit key is the CPS unit key file.

FIG. 2 illustrates the details of the data stored in the information recording medium 200, and the outline of the processing of the reproducing device 100 which reproduces the content stored in the information recording medium 200, and the content stored in the local storage unit 102, for example, the content subsequently acquired from the server 130 together.

The reproducing device 100 includes the drive 103 executing reading processing with respect to the data stored in the information recording medium.

The data processing unit 101 of the reproducing device 100, first, performs construction processing of a virtual file system (VFS), in step S11. That is, a virtual package is set in which the content stored in the information recording medium (disk) 200 and the content stored in the local storage unit 102 such as a hard disk are integrated, and the virtual file system (VFS) which is applied to the reproduction of the virtual package is constructed. According to reproduction processing based on the virtual file system (VFS), it is possible to perform reproduction similar to reproduction processing performed as if from one medium. After that, in steps S12 to S13, decoding processing and decode (for example, moving picture experts group (MPEG) decode) processing are performed with respect to the content, and thus, the content reproduction is executed.

The memory 104 is a memory configured of a ROM and a RAM which are used in the program execution area, the data storage area, and the like, and stores a device key [Kd] applied to content decoding processing, a program for executing various processings, and the like. When the content is decoded, the reproducing device 100 generates a key which is applied to the decoding of the content on the basis of the data stored in the memory 104 and the data read from the information recording medium 200, and executes the decoding processing with respect to the encryption content which becomes the reproduction target.

As described above, the data processing unit 101 of the reproducing device 100, which executes the content reproduction processing, constructs the virtual file system (VFS) and performs the reproduction processing at the time of reproducing the content stored in the information recording medium (disk) 200 and the subsequent data stored in the local storage unit 102 together. At this time, the file name conversion processing is performed with respect to the subsequent data stored in the local storage unit 102. A table applied to the conversion processing is referred to as a file name conversion table (a manifest file (MF)).

The file name conversion table (the manifest file (MF)), for example, is acquired from the server 130 providing the subsequent data.

A virtual file system (VFS) which is set in a case where the content stored in the information recording medium (disk) 200 and the subsequent data stored in the local storage unit 102 such as a hard disk are reproduced together, will be described with reference to FIG. 3. For example, the content stored in the information recording medium (disk) 200 is a video content in French, and in a case where the subsequent data stored in the local storage unit 102 such as a hard disk is Japanese subtitle data corresponding to the video content, both of the content and the subsequent data are reproduced together, and thus, video with Japanese subtitle can be reproduced.

In a case where such complex content reproducing is performed, the reproducing device 100 virtually synthesizes a directory and a file including a subsequent data management file stored in the local storage unit 102 with a directory and a file of the information recording medium (disk) 200. That is, the virtual file system (VFS) is set. The construction processing of the virtual file system (VFS) is processing in which a data file on the disk and a subsequent data file corresponding to the disk, which is stored in the local storage unit, are set to a file on one virtual directory.

Figure 3:
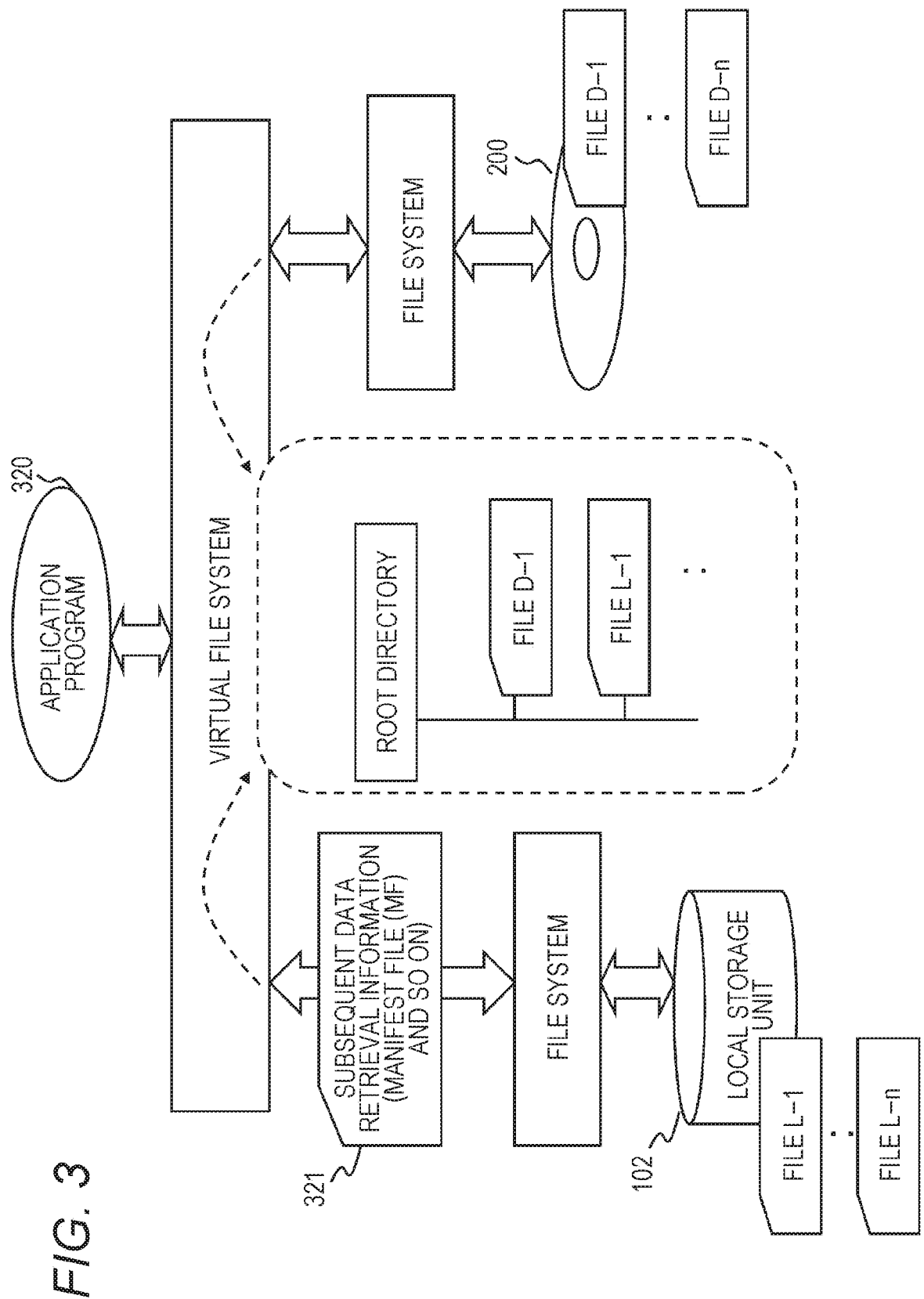
FIG. 3 is a diagram illustrating a virtual file system (VFS).

An application program 320 illustrated in FIG. 3 is an application program for executing the reproduction processing or the like in the reproducing device 100, such as the subsequent data reproduction management program (the BD-J app), or a unique program of the reproducing device 100 which is mounted on the reproducing device 100, and is executed in the data processing unit 101 of the reproducing device 100.

The application program 320 operates a file recorded in the information recording medium (disk) 200 or a file recorded in the local storage unit 102 through the virtual file system (VFS). The application program 320 acquires a subsequent data file to be required by using subsequent data retrieval information 321, which is retrieval information of the file recorded in the local storage unit 102, through the virtual file system (VFS).

The virtual file system (VFS) has a function of concealing a difference in recording mediums (file systems) with respect to the application program 320. Accordingly, the application program 320 is capable of operating files recorded in each of the recording mediums by using the same API, without any regard to the difference in the recording mediums in which the files are recorded.

For example, when the disk is mounted on the device or the application program is executed, the virtual file system (VFS) is generated by merging the file system of the disk with the file system of the local storage unit 102, and the generated virtual file system (VFS) is stored in the memory of the reproducing device 100.

Furthermore, in general, the virtual file system (VFS) is required to be updated again in the case of intending to perform processing such as adding a new content to the virtual file system (VFS) which has been constructed.

Thus, when the content stored in the information recording medium (disk) 200 and the subsequent data stored in the local storage unit 102 are reproduced together, the reproducing device 100 is required to set the virtual file system (VFS).

2. Data Storage Configuration in Local Storage Unit

In the construction processing of the virtual file system (VFS) described with reference to FIG. 3, the reproducing device 100 is required to read the subsequent data corresponding to the information recording medium (disk) 200 mounted on the reproducing device 100 from the local storage unit 102.

A plurality of subsequent data items corresponding to various disks is recorded in the local storage unit 102 configured of a hard disk or the like, and thus, the reproducing device has to select subsequent data currently corresponding to the disk mounted on the reproducing device 100 from the subsequent data items corresponding to various disks, and to construct the virtual file system (VFS).

A directory configuration example of the data stored in the local storage unit 102 will be described with reference to FIG. 4.

Various data items, various programs, and the like which are used by the user are stored in the local storage unit 102, in addition to the subsequent data corresponding to each of the disks.

Each of such data items is stored according to a directory configuration having a hierarchical structure in which a root directory 401 set as a top node, is set to a vertex.

The subsequent data corresponding to each of the disks which is reproduced by using the virtual file system (VFS), is recorded within a binding unit data area (BUDA) root directory 402 which is immediately below the root directory 401.

Directories in each studio unit, that is, studio directories 403 and 404 in the studio unit which is the maker of the content recorded in the disk, are set within the BUDA root directory 402.

In the reproduction processing of a disk in which a making content of the studio A is recorded, subsequent data is selected from a data recording area within the directory 403 of the studio A.

In the reproduction processing of a disk in which a making content of the studio B is recorded, subsequent data is selected from a data recording area within the directory 404 of the studio B.

Further, disk directories 411 to 414 which are directories in the disk unit, are set within each of the studio directories 403 and 404.

In the content reproduction processing of a specific disk, subsequent data which is used for constructing the virtual file system (VFS), is recorded within the disk directory.

Furthermore, the subsequent data which is used for constructing the virtual file system (VFS) includes a playlist file which is a reproduction control information file, and reproduction interval data, a clip information file storing reproduction target data, a clip AV stream file, and the like.

Figure 4:
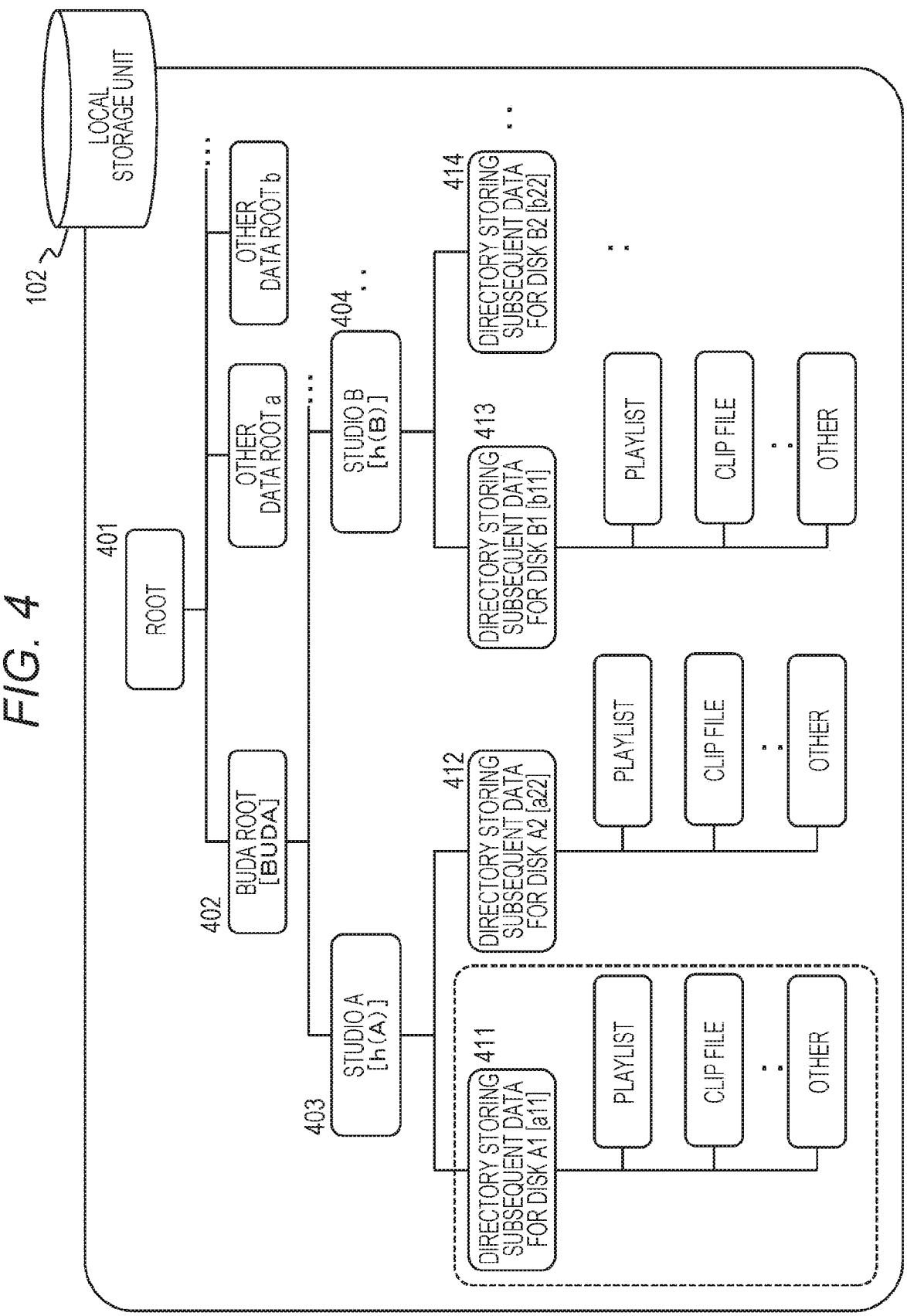
FIG. 4 is a diagram illustrating a directory configuration in a local storage unit.

The data processing unit 101 of the reproducing device 100 selects and acquires the subsequent data corresponding to the information recording medium (disk) 200 mounted on the reproducing device 100 from the subsequent data stored in the local storage unit 102, constructs the virtual file system (VFS), and executes the reproduction processing, according to the directory configuration illustrated in FIG. 4.

An example of an access file name (path) in a case where the data processing unit 101 of the reproducing device 100 acquires the subsequent data corresponding to the mounted disk from the local storage unit 102, is illustrated in FIG. 5.

FIG. 5 illustrates the following examples of the access file name (path).

(1) BUDA/h(A)/a11/PLAYLIST0001.mpls
(2) BUDA/h(A)/a11/CLIPINF00001.clpi
(3) BUDA/h(A)/a11/AVSTREAM0001.m2ts BUDA is designated information (a directory name) of a BUDA root illustrated in FIG. 4.

h(A) is designated information (a directory name) of the directory 403 of the studio A illustrated in FIG. 4.

a11 is designated information (a directory name) of the disk directory 411 illustrated in FIG. 4.

Each of PLAYLIST0001.pls, CLIPINF00001.clpi, and AVSTREAM0001.m2ts corresponds to an individual file name recorded within the disk directory 411 illustrated in FIG. 4.

Furthermore, in an example illustrated in FIG. 5, h(A) which is the designated information (the directory name) of the directory 403 of the studio A, is a hash value of data A.

The data A corresponds to configuration data of the root certificate (the public key certificate of the studio A) recorded in the disk mounted on the reproducing device, and the data processing unit 101 of the reproducing device 100 is capable of acquiring configuration data (A) which is the root certificate recorded in the disk, and of calculating a hash value h(A) by applying a hash value calculation function prescribed in advance, for example, SHA-1.

The disk ID recorded in the disk mounted on the reproducing device, which is the designated information (the directory name) of the disk directory 411, can be used.

Thus, the reproducing device 100 is capable of generating and accessing access information of subsequent data corresponding to the disk used for constructing the virtual file system (VFS) by using data which can be acquired from the information recording medium (disk) 200 mounted on the reproducing device 100.

However, the disk ID or the like is a mere numerical string, and thus, there is a possibility that overlap occurs. In addition, h(A) which is the designated information (the directory name) of the directory 403 of the studio A, is the hash value of the data A, that is, a hash value of the configuration data of the root certificate (the public key certificate of the studio A) recorded in the disk mounted on the reproducing device, and is a common value in the case of a disk storing the content recorded in the same studio A.

As a result thereof, for example, in a case where disk IDs such as:

(a) a disk ID of a disk (V1) of a version 1 storing an HD image content of a content X made by the studio A; and (b) a disk ID of a disk (V2) of a version 2 storing a UHD image content of the content X made by the studio A are coincident with each other, such data items are recorded by being mixed within the same directory.

Figure 6:
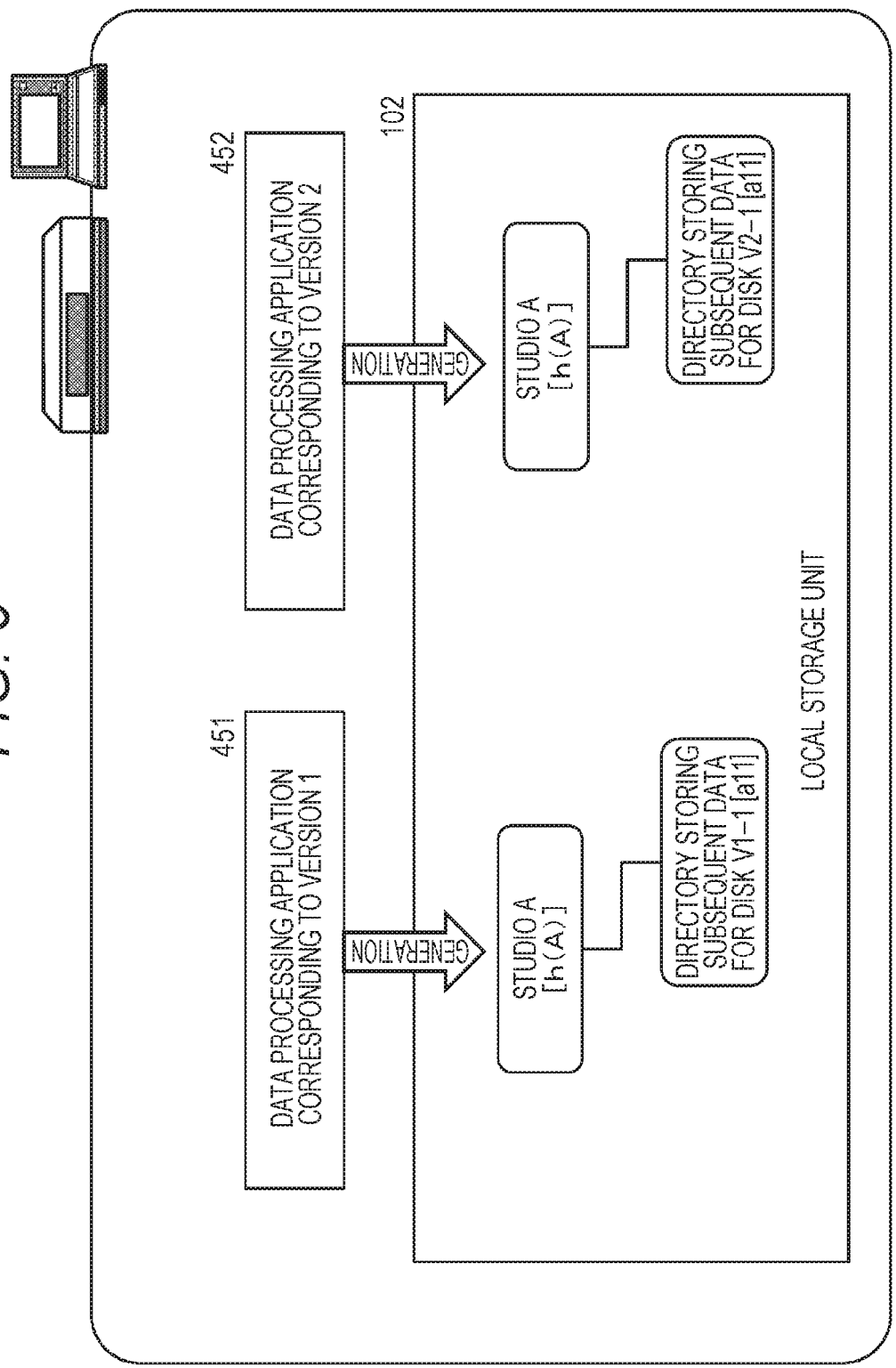
FIG. 6 is a diagram illustrating an example in which subsequent data items corresponding to disks of different versions are mixed.

FIG. 6 illustrates an example of directory setting in a case where the reproducing device 100 acquires new subsequent data from the server, and records the subsequent data in the local storage unit 102.

In the data processing unit 101 of the reproducing device 100, any one of the following data processing applications is executed according to the version of the disk mounted on the reproducing device.

(1) a data processing application 451 corresponding to the version 1, which executes reproduction processing or the like of the disk (V1) of the version 1 storing the HD image content, or (2) a data processing application 452 corresponding to the version 2, which executes reproduction processing or the like of the disk (V2) of the version 2 storing the UHD image content.

Such data processing applications execute data processing according to a unique algorithm prescribed in advance.

The setting of the directory name for storing the subsequent data in the local storage unit is also performed by each of the applications.

As a result thereof, as illustrated, there is a case where the same directory name is set.

Furthermore, in a case where the same directory name is set in advance in the local storage unit, the subsequent data acquired from the server is recorded within the directory.

Figure 7:
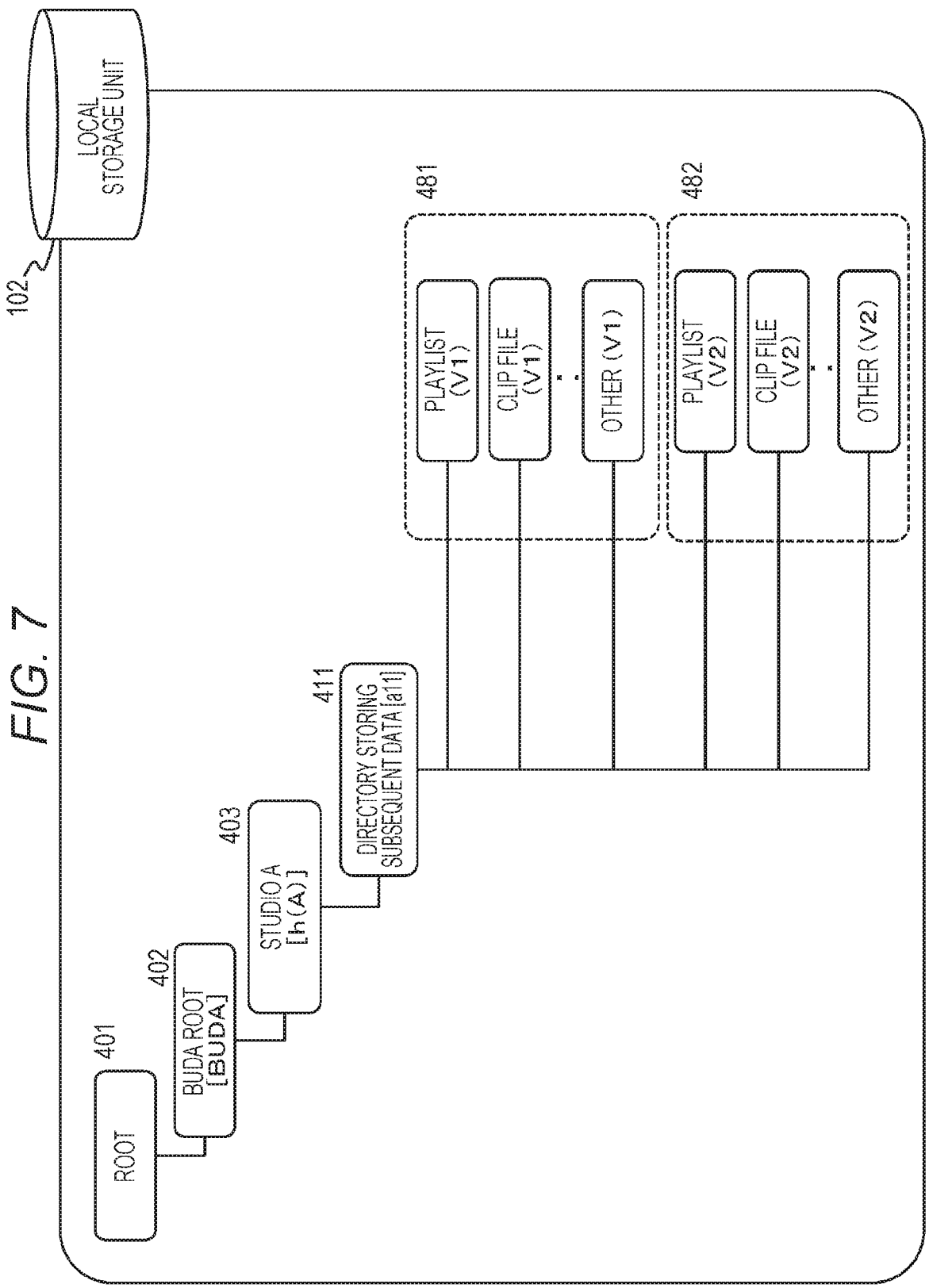
FIG. 7 is a diagram illustrating an example in which the subsequent data items corresponding to the disks of different versions are mixed.

As a result thereof, as illustrated in FIG. 7, a situation may occur in which both of subsequent data 481 for reproducing an HD image corresponding to the version 1 (V1) and subsequent data 482 for reproducing a UHD image corresponding to the version 2 (V2) are recorded within the same directory.

In a case where such subsequent data recording processing is performed, and the reproducing device 100 performs reproduction by mounting the disk of the version 1 (V1), the virtual file system (VFS) including not only the subsequent data 481 corresponding to the disk of the version 1 (V1) but also the subsequent data 482 corresponding to the disk of the version 2 (V2) is constructed, and the reproduction starts.

Even in a case where the reproducing device 100 performs reproduction by mounting the disk of the version 2 (V2), the virtual file system (VFS) including both of the subsequent data 481 corresponding to the disk of the version 1 (V1) and the subsequent data 482 corresponding to the disk of the version 2 (V2) is constructed, and the reproduction starts.

In such cases, for example, there is a possibility that a codec (a decoding function) used by each of the reproducing applications is not adequate for subsequent data items having different versions, and thus, allows a reproduction error to occur.

3. Configuration Capable of Reliably Selecting Subsequent Data Corresponding to Disk Next, the configuration of the present disclosure in which the problems described above can be solved and the subsequent data corresponding to the disk can be reliably selected, will be described.

Figure 8:
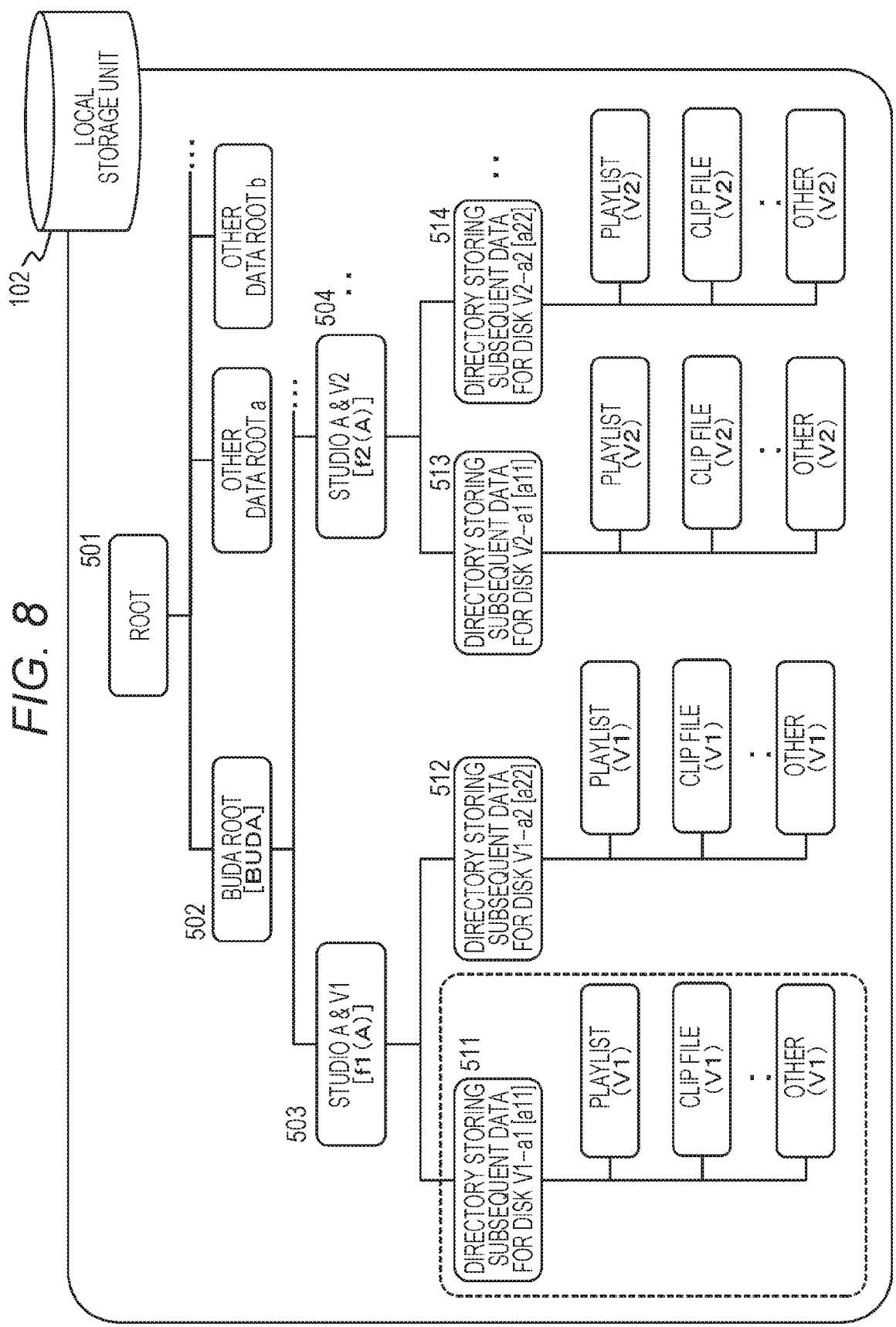
FIG. 8 is a diagram illustrating a directory configuration example of the local storage unit which is capable of reliably acquiring the subsequent data corresponding to the disk.

FIG. 8 is a diagram illustrating an example of directory setting in the local storage unit 102 according to an example of the present disclosure.

Furthermore, the following subsequent data items corresponding to disks of two different versions are recorded in the local storage unit 102.

(1) subsequent data corresponding to the disk (V1) of the version 1, and (2) subsequent data corresponding to the disk (V2) of the version 2.

For example, an HD image content is recorded in the disk (V1) of the version 1, and an HD image content is recorded in the subsequent data corresponding to the disk (V1).

In addition, a UHD image content is recorded in the disk (V2) of the version 2, and a UHD image content is recorded in the subsequent data corresponding to the disk (V2).

In addition, a decoding processing mode of the content recorded in the disk (V1) of the version 1 and the subsequent data is different from a decoding processing mode of the content recorded in the disk (V2) of the version 2 and the subsequent data, and in the reproduction processing, data processing adequate for each of the versions is required to be performed.

The example of the directory setting in the local storage unit 102 according to the example of the present disclosure, illustrated in FIG. 8, will be described.

Each data item is stored according to a directory configuration having a hierarchical structure in which a root directory 501, which is a top node, is set to a vertex.

The subsequent data corresponding to each of the disks which is reproduced by using the virtual file system (VFS), is recorded within a binding unit data area (BUDA) root directory 502 which is immediately below the root directory 501.

Directories in each studio and version unit, that is, studio & version directories 503 and 504 in the studio and version unit which is the maker of the content recorded in the disk, are set within the BUDA root directory 502.

In the reproduction processing of the content of the version 1, which is the making content of the studio A, for example, the disk (V1) in which the HD content is recorded, subsequent data is selected from a data recording area within the studio A & V1 directory 503.

In the reproduction processing of the content of the version 2, which is the making content of the studio A, for example, the disk (V2) in which the UHD content is recorded, subsequent data is selected from a data recording area within the studio A & V2 directory 504.

Further, disk directories 511 to 514 which are directories in the disk unit, are set within each of the studio & version directories 503 and 504.

Here, the content of the version 1, which is the making content of the studio A, for example, only the subsequent data corresponding to the version 1 corresponding to the disk (V1) in which the HD content is recorded is recorded in the disk directories 511 and 512 within the studio A & V1 directory 503.

In addition, the content of the version 2, which is the making content of the studio A, for example, only the subsequent data corresponding to the version 2 corresponding to the disk (V2) in which the UHD content is recorded is recorded in the disk directories 513 and 514 within the studio A & V2 directory 504.

In the content reproduction processing of a specific disk, the subsequent data used for constructing the virtual file system (VFS) is recorded in each of the disk directories 511 to 514.

Furthermore, the subsequent data used for constructing the virtual file system (VFS) includes a playlist file which is a reproduction control information file, and a clip information file storing reproduction interval data or reproduction target data, a clip AV stream file formed of reproduction image data, and the like. Furthermore, FIG. 8 collectively illustrates the clip information file and the clip AV stream file as a clip file.

The data processing unit 101 of the reproducing device 100 selects and acquires subsequent data corresponding to the information recording medium (disk) 200 of a specific version mounted on the reproducing device 100 from the subsequent data stored in the local storage unit 102 according to the directory configuration illustrated in FIG. 8, constructs the virtual file system (VFS), and executes the reproduction processing.

Furthermore, version (V1, V2, and the like) information of the disk can be acquired from the disk.

In the directory configuration illustrated in FIG. 8, directory names of the studio & version directories 503 and 504 in the studio and version unit, which are set within the BUDA root directory 502, are different directory names.

An example of specific directory name (node name) setting will be described.

The directory name (=the node name) of the studio A & V1 directory 503 is set to f1(A).

f1(A) corresponds to a conversion value obtained by applying a conversion function f1 to the data A. The conversion function f1, for example, is a hash function, and in this case, f1(A) is the hash value of the data A.

The data A corresponds to the configuration data of the root certificate (the public key certificate of the studio A) recorded in the disk mounted on the reproducing device, and the data processing unit 101 of the reproducing device 100 is capable of acquiring configuration data (A) of the root certificate recorded in the disk, and of calculating the conversion value f1(A) of the data A by applying the function f1 prescribed in advance.

Specifically, the function f1, for example, is the hash value calculation function, for example, SHA-1, and in this case, the conversion value f1(A) of the data A is the hash value of the data A.

The directory name (=the node name) of the studio A & V2 directory 504 is set to f2 (A).

f2 (A) is a conversion value which is calculated by applying a conversion function f2 to the data A. The conversion function f2 is a conversion function which is different from the conversion function f1. f2, for example, is also a hash function which is different from f1, and in this case, f2(A) is the hash value of the data A.

The data A corresponds to the configuration data of the root certificate (the public key certificate of the studio A) recorded in the disk mounted on the reproducing device, and the data processing unit 101 of the reproducing device 100 is capable of acquiring the configuration data (A) of the root certificate recorded in the disk, and of calculating the conversion value f2 (A) of the data A by applying a function f2 prescribed in advance.

Here, the function f1 and the function f2 are different conversion functions, and values generated by applying each of the functions on the basis of the same data A, that is, f1(A) and f2 (A) are different values. Accordingly, the directory name (=f1(A)) of the studio A & V1 directory 503 is set to be different from the directory name (=f2 (A)) of the studio A & V2 directory 504.

Thus, in this example, different directories of different directory names according to the studio and the version are set in a subsequent data storage area of the local storage unit 102.

Further, an individual directory in the disk unit corresponding to the studio and the version is set within such directories in the studio and version unit, and the subsequent data in the disk unit is recorded within the directories in the disk unit.

As a result thereof, even in a case where the content producers are the same, and configuration data items of root certificates (public key certificates) read from disks of different versions are the same (for example, A), different directories are set according to the version of the disk, and subsequent data according to the studio and the version is recorded in each of the directories.

An example of setting the subsequent data to be recorded in the local storage unit 102 according to this example will be described with reference to FIG. 9.

As illustrated in FIG. 9, two studio & version directories described below are set within the root directory 501 and the binding unit data area (BUDA) directory 502.

(1) the studio A & V1 directory 503
(2) the studio A & V2 directory 504
(1) the directory name (the node name) of the studio A & V1 directory 503 is a value calculated by f1(A).
(2) the directory name (the node name) of the studio A & V2 directory 504 is a value calculated by f2(A).

Furthermore, A is the root certificate which is commonly stored in the disk of the version 1 and the disk of the version 2, that is, the configuration data of the public key certificate of the studio A.

For example, a disk (V1-a1) directory 511 corresponding to a disk ID of a1 is set within (1) the studio A & V1 directory 503, and subsequent data 521 corresponding to a disk (V1-a1) is recorded within this directory.

The subsequent data 521 is the content recorded in the disk of the version 1, for example, is subsequent data corresponding to an HD content.

On the other hand, a disk (V2-a1) directory 513 having the same disk ID of a1 is set within (2) the studio A & V2 directory 504, and subsequent data 522 corresponding to a disk (V2-a1) is recorded within this directory.

The subsequent data 522 is the content recorded in the disk of the version 2, for example, subsequent data corresponding to a UHD content.

Thus, even though the subsequent data 521 for reproducing an HD image corresponding to the version 1 (V1) and the subsequent data 522 for reproducing a UHD image corresponding to the version 2 (V2), for example, have the same disk ID, the subsequent data items are separately recorded in different studio & version directories.

According to such subsequent data recording processing, in a case where the reproducing device 100 performs the reproduction by mounting the disk of the version 1 (V1), it is possible to reliably select and acquire only the subsequent data 521 corresponding to the disk of the version 1 (V1), to construct the virtual file system (VFS), and to allow the reproduction to start.

Even in a case where the reproducing device 100 performs the reproduction by mounting the disk of the version 2 (V2), it is possible to construct the virtual file system (VFS) including only the subsequent data 522 corresponding to the disk of the version 2 (V2), and to allow the reproduction to start.

In such a case, for example, the codec (the decoding function) used by each of the reproducing applications is adequate for the subsequent data, and the reproduction using the virtual file system (VFS) is accurately performed without allowing a reproduction error to occur.

The directory name of the directory which is set according to the studio and the disk version, is calculated on the basis of the root certificate read out from the disk of each version, that is, the configuration data of the public key certificate of the studio.

For example, in a case where the configuration data of the public key certificate of the studio A is set to A, the directory name of the studio & version directory which is set in the subsequent data storage area corresponding to the disk (V1) of the version 1 is the following value calculated by applying the function f1:

f1(A).

The directory name of the studio & version directory which is set in the subsequent data storage area corresponding to the disk (V2) of the version 2 is the following value calculated by applying the function f2:

f2(A).

Furthermore, in the case of the disk storing the making content of the studio B which is different from the studio A, and the configuration data of the public key certificate of the studio B is set to B, the directory name of the studio & version directory which is set in the subsequent data storage area corresponding to the disk (V1) of the version 1 is the following value calculated by applying the function f1:

f1(B).

The directory name of the studio & version directory which is set in the subsequent data storage area corresponding to the disk (V2) of the version 2 is the following value calculated by applying the function f2:

f2(B).

Various functions can be applied as the directory name calculation functions f1 and f2.

A specific example of the function will be described with reference to FIG. 10.

FIG. 10 illustrates three different setting examples (1), (2), and (3) of the functions f1 and f2.

(1) is an example in which the function f1 is set to a function which is applied to the data which can be read from the disk, for example, the configuration data A of the root certificate only once, and the function f2 is set to a function which is obtained by repeatedly applying the function f1 to the data A twice.

That is, $f2(A)=f1(f1(A))$ is obtained.

For example, a hash function SHA-1 or SHA-256, or the like is applied as the function f1.

For example, in a case where a hash function to be applied is set to h1=SHA-1, the function f1 is processing in which the hash function h1 is applied to the configuration data of the root certificate read out from the disk, for example, the configuration data A once.

That is, $f1(A)=h1(A)$ is obtained.

In addition, the function f2 is processing in which the hash function h is applied to the configuration data of the root certificate read out from the disk, for example, the configuration data A twice.

That is, $f2(A)=h1(h1(A))$ is obtained.

In this case, $f1(A)=h1(A)$ is the name of the studio A & V1 directory.

$f2(A)=h1(h1(A))$ is the name of the studio A & V2 directory.

An example of function setting in (2) of FIG. 10 is an example in which the function f1 and the function f2 are set as different data conversion functions.

For example, the function f1 is set to a function to which a first hash function h1 is applied, and the function f2 is set to a function to which a second hash function h2 different from the first hash function h1 is applied.

For example, the first hash function is set to h1=SHA-1, and the second hash function is set to h2=SHA-256.

In this case, the function f1 is processing in which the first hash function h1 is applied to the configuration data of the root certificate read out from the disk, for example, the configuration data A.

That is, $f1(A)=h1(A)$ is obtained.

In addition, the function f2 is processing in which the second hash function h2 is applied to the configuration data of the root certificate read out from the disk, for example, the configuration data A.

That is, $f2(A)=h2(A)$ is obtained.

In this case, $f1(A)=h1(A)$ is the name of the studio A & V1 directory.

$f2(A)=h2(A)$ is the name of the studio A & V2 directory.

An example of function setting in (3) of FIG. 10 is an example in which the function f2 is set to a function concatenating the results of the function f1.

For example, the function f1 is set to a function to which the first hash function is applied, and the function f2 is set to a function executing processing of concatenating the results of applying the first hash function.

For example, the function f1 is set to a hash function: h1=SHA-1.

In this case, the function f1 is processing in which the first hash function h1 is applied to the configuration data of the root certificate read out from the disk, for example, the configuration data A.

That is, $f1(A)=h1(A)$ is obtained.

In addition, the function f2 is processing of concatenating the results of applying the hash function h1 to the configuration data of the root certificate read out from the disk, for example, the configuration data A.

That is, $f2(A)=h1(A)\|h1(A)$ is obtained.

Furthermore, a∥b represents concatenation processing of data a and data b.

In this case, $f1(A)=h1(A)$ is the name of the studio A & V1 directory.

$f2(A)=h1(A)\|h1(A)$ is the name of the studio A & V2 directory.

4. Configuration and Use Processing of Data Access Permission Information

Next, the configuration and the use processing of the data access permission information will be described.

As described above with reference to FIG. 2, the data access permission information 204 is a certificate in which the access permission information of the data (the subsequent data) stored in the local storage unit 102 of the reproducing device 100 is recorded.

In general, data can be read from only one subsequent data recording area stored in the local storage unit 102, corresponding to the disk mounted on the reproducing device 100, and there is a case where subsequent data recorded in a subsequent data recording area corresponding to the other disk which does not correspond to the mounted disk is used.

In such a case, the data access permission information 204 is recorded in the disk.

The reproducing device is capable of reading out the data from the subsequent data recording area corresponding to the other disk to which access is permitted, of constructing the virtual file system (VFS), and of using the data, with reference to the data access permission information 204 acquired from the disk.

Furthermore, the data access permission information 204 may have a configuration of being acquired from the server providing the subsequent data.

A specific processing example in which data is read out from the subsequent data recording area corresponding to the other disk to which access is permitted by using the data access permission information 204 and the virtual file system (VFS) is constructed, will be described with reference to FIG. 11.

FIG. 11 is a diagram illustrating a directory configuration of the data stored in the local storage unit 102 of the reproducing device 100.

A plurality of studio & version directories 503 to 506 is set within the BUDA root directory 502 below the root directory 501.

The subsequent data which is the making content of the studio A and corresponds to the disk of the version 1, is recorded within the studio A & V1 directory 503.

The subsequent data which is the making content of the studio A and corresponds to the disk of the version 2 is recorded within the studio A & V2 directory 504.

The subsequent data which is the making content of the studio B and corresponds to the disk of the version 1 is recorded within the studio B & V1 directory 505.

The subsequent data which is the making content of the studio B and corresponds to the disk of the version 2 is recorded within the studio B & V2 directory 506.

Disk directories 511, 513, and 552, which are directories in the disk unit, are set within the studio & version directories 503 to 506.

In the content reproduction processing of a specific disk, the subsequent data which is used for constructing the virtual file system (VFS), is recorded within the disk directory.

Furthermore, the subsequent data which is used for constructing the virtual file system (VFS) includes a playlist file which is a reproduction control information file, and reproduction interval data, a clip information file storing reproduction target data, a clip AV stream file, and the like.

For example, a case where the disk (V2-a1) of the version 2 in which the content made by the studio A is recorded, is mounted on the reproducing device 100, the virtual file system (VFS) is constructed, and the reproduction processing is performed, will be considered.

In this case, the data processing unit 101 of the reproducing device 100 selects the subsequent data corresponding to the mounted disk from the local storage unit 102, as the subsequent data for constructing the virtual file system (VFS).

That is, the data of the subsequent data store directory 513 for the disk (V2-a1) within the studio A & V2 directory 504 is selected as the subsequent data for constructing the virtual file system (VFS).

Further, in a case where the data access permission information is recorded the disk (V2-a1) of the version 2 mounted on the reproducing device, subsequent data other than the subsequent data corresponding to the mounted disk can be read out according to recording information of the data access permission information, and can be used for constructing the virtual file system (VFS) and for performing the reproduction processing.

Specifically, for example, the data of the subsequent data store directory 552 for the disk (V2-b1) within the studio B & V2 directory 506 illustrated in FIG. 11 can be used for constructing the virtual file system (VFS) and for performing the reproduction processing.

In this case, the studio B & V2 directory 506 is a data provider directory, and the studio A & V2 directory 504 is a data recipient directory.

Information or the like relevant to the data provider directory or the data recipient directory is recorded in the data access permission information recorded in the disk.

FIG. 12 illustrates a specific example of the data access permission information recorded in the disk.

Furthermore, the example illustrated in FIG. 12 is a specific example of data access permission information corresponding to subsequent data which is used at the time of reproducing the content recorded in the disk of the version 2.

As illustrated in FIG. 12, each data item described below is recorded in the data access permission information.

(1) a data recipient ID (for example, a studio A-ID)
(2) a data provider ID (for example, a studio B-ID)
(3) a data recipient directory identifier (for example, f2(A))
(4) a data provider directory identifier (for example, f2(B))
(5) a provided data file list
(6) other data
(7) an issuer signature (1) the data recipient ID is an organization ID of the content producer on a side where data access of the subsequent data is permitted. For example, in an example illustrated in FIG. 11, in a case where the reproducing device 100 performs the reproduction by mounting the disk of the version 2 storing the making content of the studio A, the organization ID of the studio A is recorded.

(2) the data provider ID is an organization ID of the content producer on a side where the data access of the subsequent data is permitted. For example, in the example illustrated in FIG. 11, in a case where the reproducing device 100 performs the reproduction by mounting the disk of the version 2 storing the making content of the studio A, an organization ID of a studio other than the subsequent data of the studio A, that is, an organization ID of a studio permitting data access is recorded. For example, the organization ID of the studio B, which is a studio preparing the subsequent data stored in the data provider directory illustrated in FIG. 11, is recorded.

(3) a directory identifier of subsequent data corresponding to a disk mounted on a reproducing device A is recorded as the data recipient directory identifier. In the example illustrated in FIG. 11, a directory name (f2(A)) of a studio & version directory of the data recipient directory is recorded.

(4) the data provider directory identifier is an identifier recording area of a directory permitting data access. In the example illustrated in FIG. 11, a directory name (f2 (B)) of a studio & version directory of the data provider directory is recorded.

(5) a file list of the subsequent data in the directory permitting data access is recorded in the provided data file list. In the case of the example illustrated in FIG. 11, a playlist or a clip file list in the data provider directory is recorded.

(7) the issuer signature is a signature of a secret key of an issuer of the data access permission information. For example, a signature of a manager executing content management or a signature of a data provider is provided.

The signature is data which is used for confirming the legitimacy of the data access permission information.

Furthermore, in a case where the disk mounted on the reproducing device 100 is the disk of the version 2, the data access permission information illustrated in FIG. 12 is an example of the data access permission information recorded in the disk of the version 2.

In this case, both of the directory identifiers:
(3) the data recipient directory identifier (for example, f2 (A)); and
(4) the data provider directory identifier (for example, f2 (B)),
are recorded as the directory identifier of the directory in which the subsequent data corresponding to the version 2 is recorded.

Furthermore, in a case where processing using the data access permission information illustrated in FIG. 12 is performed, a root certificate (a public key certificate) of the data provider is also recorded in the disk. Alternatively, the root certificate (the public key certificate) of the data provider is acquired from a subsequent data providing server.

The reproducing device is capable of calculating the data provider directory identifier (for example, f2(B)) on the basis of the root certificate (the public key certificate) of the data provider.

According to such setting, in a case where the disk of the version 2 is mounted on the reproducing device 100, only the subsequent data corresponding to the version 2 can be selected from the directory of the local storage unit 102 in which the subsequent data corresponding to the version 2 is recorded, the virtual file system (VFS) can be constructed, and the reproduction can be performed.

That is, the occurrence of an error that the subsequent data of the version 1 is erroneously selected can be prevented.

On the other hand, in a case where the disk of the version 1 is mounted on the reproducing device 100, the data recipient directory or the data provider directory of the subsequent data which is selected from the local storage unit at the time of constructing the virtual file system (VFS), is required to be set in the directory in which the subsequent data corresponding to the disk of the version 1 is recorded.

Directory setting for this and a data configuration example of the data access permission information will be described with reference to FIG. 13 and FIG. 14.

Figure 13:
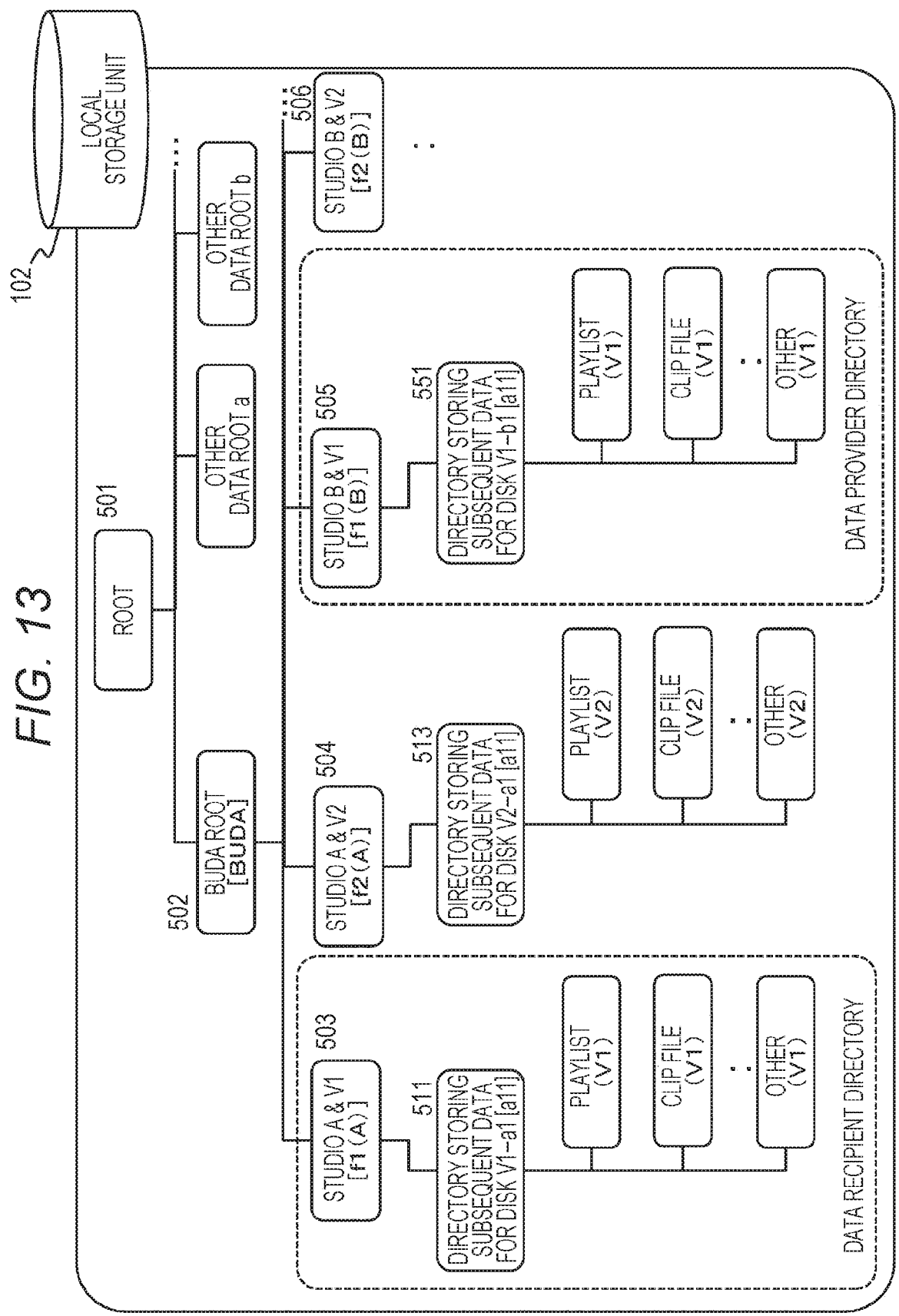
FIG. 13 is a diagram illustrating the data in the local storage unit which can be used in a case where the data access permission information is used.

FIG. 13 illustrates a data recipient directory in a case where the disk mounted on the reproducing device 100 is the disk of the version 1, and a setting example of the data provider directory.

The making content of the studio A is recorded in the disk of the version 1 mounted on the reproducing device 100, and the subsequent data corresponding thereto is recorded within the studio A & V1 directory 503.

Further, the data access permission information is recorded in the disk, and information relevant to the data provider directory, illustrated in FIG. 13, is recorded in the data access permission information.

That is, the data access permission information is data access permission information including designated information of the studio B & V1 directory 505 in which the subsequent data made by the studio B corresponding to the version 1 is recorded.

An example of the data access permission information corresponding to the version 1 is illustrated in FIG. 14.

As illustrated in FIG. 14, each data item described below is recorded in the data access permission information.
(1) a data recipient ID (for example, a studio A-ID)
(2) a data provider ID (for example, a studio B-ID)
(3) a data recipient directory identifier (for example, f1(A))
(4) a data provider directory identifier (for example, f1(B))
(5) a provided data file list
(6) other data
(7) an issuer signature (1) the data recipient ID is an organization ID of the content producer on a side where data access of the subsequent data is permitted. For example, in an example illustrated in FIG. 13, in a case where the reproducing device 100 performs the reproduction by mounting the disk of the version 1 storing the making content of the studio A, the organization ID of the studio A is recorded.

(2) the data provider ID is an organization ID of the content producer on a side where the data access of the subsequent data is permitted. For example, in the example illustrated in FIG. 13, in a case where the reproducing device 100 performs the reproduction by mounting the disk of the version 1 storing the making content of the studio A, an organization ID of a studio other than the subsequent data of the studio A, that is, an organization ID of a studio permitting data access is recorded. For example, the organization ID of the studio B, which is a studio preparing the subsequent data stored in the data provider directory illustrated in FIG. 13, is recorded.

(3) a directory identifier of subsequent data corresponding to the disk mounted on the reproducing device A is recorded as the data recipient directory identifier. In the example illustrated in FIG. 13, a directory name (f1(A)) of a studio & version directory of the data recipient directory is recorded.

(4) the data provider directory identifier is an identifier recording area of a directory permitting data access. In the example illustrated in FIG. 13, a directory name (f1(B)) of a studio & version directory of the data provider directory is recorded.

(5) a file list of the subsequent data in the directory permitting data access is recorded in the provided data file list. In the case of the example illustrated in FIG. 13, a playlist or a clip file list in the data provider directory is recorded.

(7) the issuer signature is a signature of a secret key of an issuer of the data access permission information. For example, a signature of a manager executing content management or a signature of a data provider is provided.

The signature is data which is used for confirming the legitimacy of the data access permission information.

In a case where the disk mounted on the reproducing device 100 is the disk of the version 1, the data access permission information illustrated in FIG. 14 is an example of the data access permission information recorded in the disk of the version 1.

In this case, both of the directory identifiers:

(3) the data recipient directory identifier (for example, f1(A)); and (4) the data provider directory identifier (for example, f1(B)), are recorded as the directory identifier of the directory in which the subsequent data corresponding to the version 1 is recorded.

Furthermore, in a case where the reproducing device 100 performs processing using the data access permission information illustrated in FIG. 14, the reproducing device 100 acquires a root certificate (a public key certificate) of the data provider from the disk or the server.

The reproducing device is capable of calculating the data provider directory identifier (for example, f1(B)) on the basis of the root certificate (the public key certificate) of the data provider.

According to such setting, in a case where the disk of the version 1 is mounted on the reproducing device 100, only the subsequent data corresponding to the version 1 can be selected from the directory of the local storage unit 102 in which the subsequent data corresponding to the version 1 is recorded, the virtual file system (VFS) can be constructed, and the reproduction can be performed.

That is, the occurrence of an error that the subsequent data of the version 2 is erroneously selected can be prevented.

5. Data Processing Sequence Executed in Reproducing Device

Next, a data processing sequence executed in the reproducing device will be described with reference to flow charts illustrated in FIG. 15 and thereafter.

Figure 15:
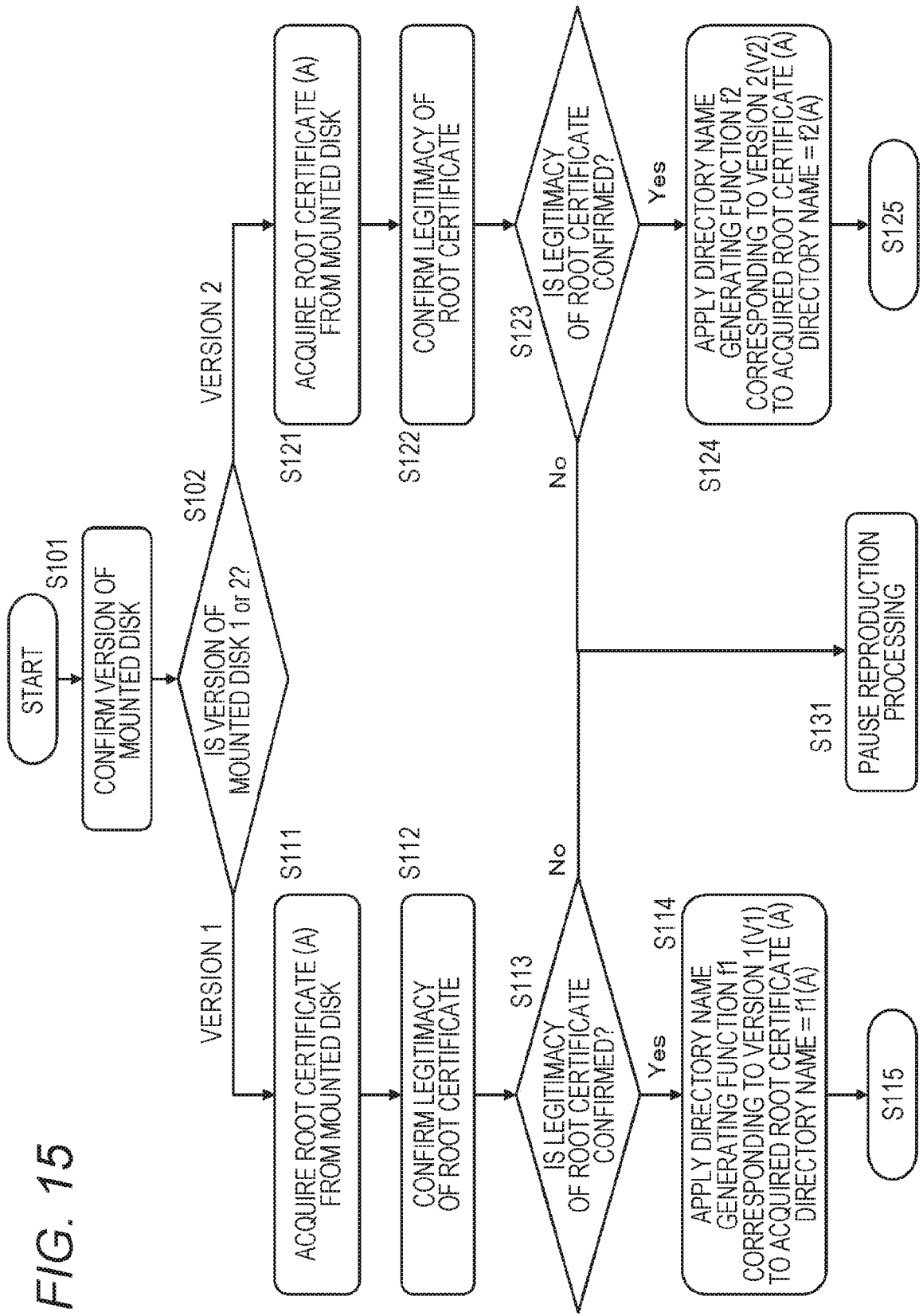
FIG. 15 is a diagram illustrating a flow chart which illustrates a processing sequence executed in the reproducing device.

Furthermore, processing according to flows in FIG. 15 and thereafter is a processing example of a device which is capable of reproducing contents from disks of two versions of the version 1 and the version 2.

In a reproducing device which is capable of reproducing the content of only the disk of the version 1, only processing which is performed by mounting the disk of the version 1, is executed in the flows illustrated in FIG. 15 and thereafter.

In addition, in a reproducing device which is capable of reproducing the content of only the disk of the version 2, only processing which is performed by mounting the disk of the version 2, is executed in the flows illustrated in FIG. 15 and thereafter.

The processing according to the flows illustrated in FIG. 15 and thereafter, is executed in the data processing unit of the reproducing device 100, which includes a CPU or the like having a program execution function. The program is stored in the memory of the reproducing device 100. Alternatively, the program is read from a medium such as a disk and is executed.

Two processing examples described below will be described with reference to the flow charts of FIG. 15 and thereafter.

(A) Processing Example 1. Reproduction Processing Example in Absence of Confirmation Processing of Data Access Permission Information (FIG. 15 and FIG. 16)

(B) Processing Example 2. Reproduction Processing Example in Presence of Confirmation Processing of Data Access Permission Information (FIG. 17 to FIG. 21)

5-1. Processing Example 1: Reproduction Processing Example in Absence of Confirmation Processing of Data Access Permission Information First, a reproduction processing example in the absence of confirmation processing of the data access permission information will be described with reference to the flow charts illustrated in FIG. 15 and FIG. 16.

Figure 16:
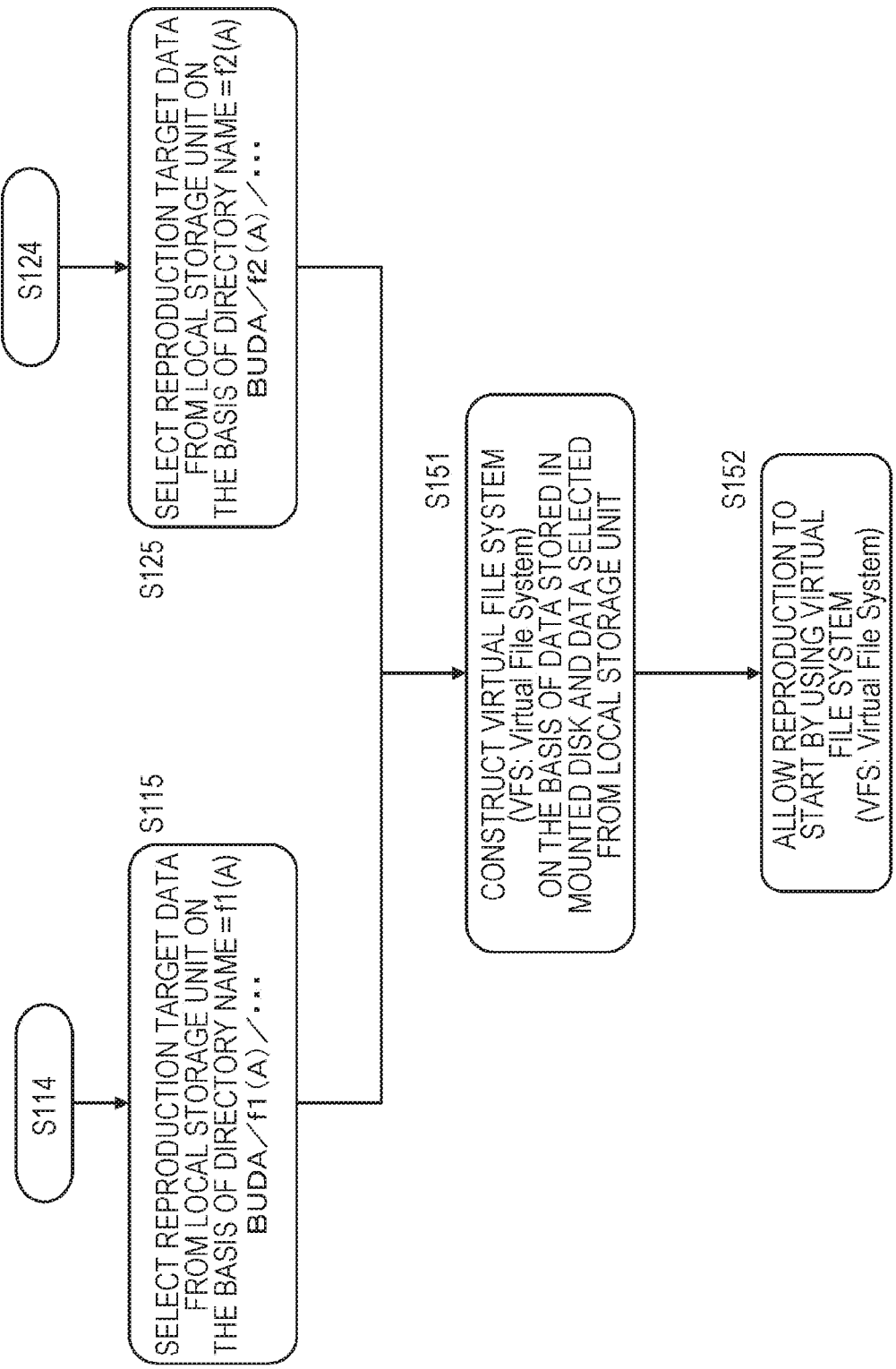
FIG. 16 is a diagram illustrating a flow chart which illustrates the processing sequence executed in the reproducing device.
Figure 17:
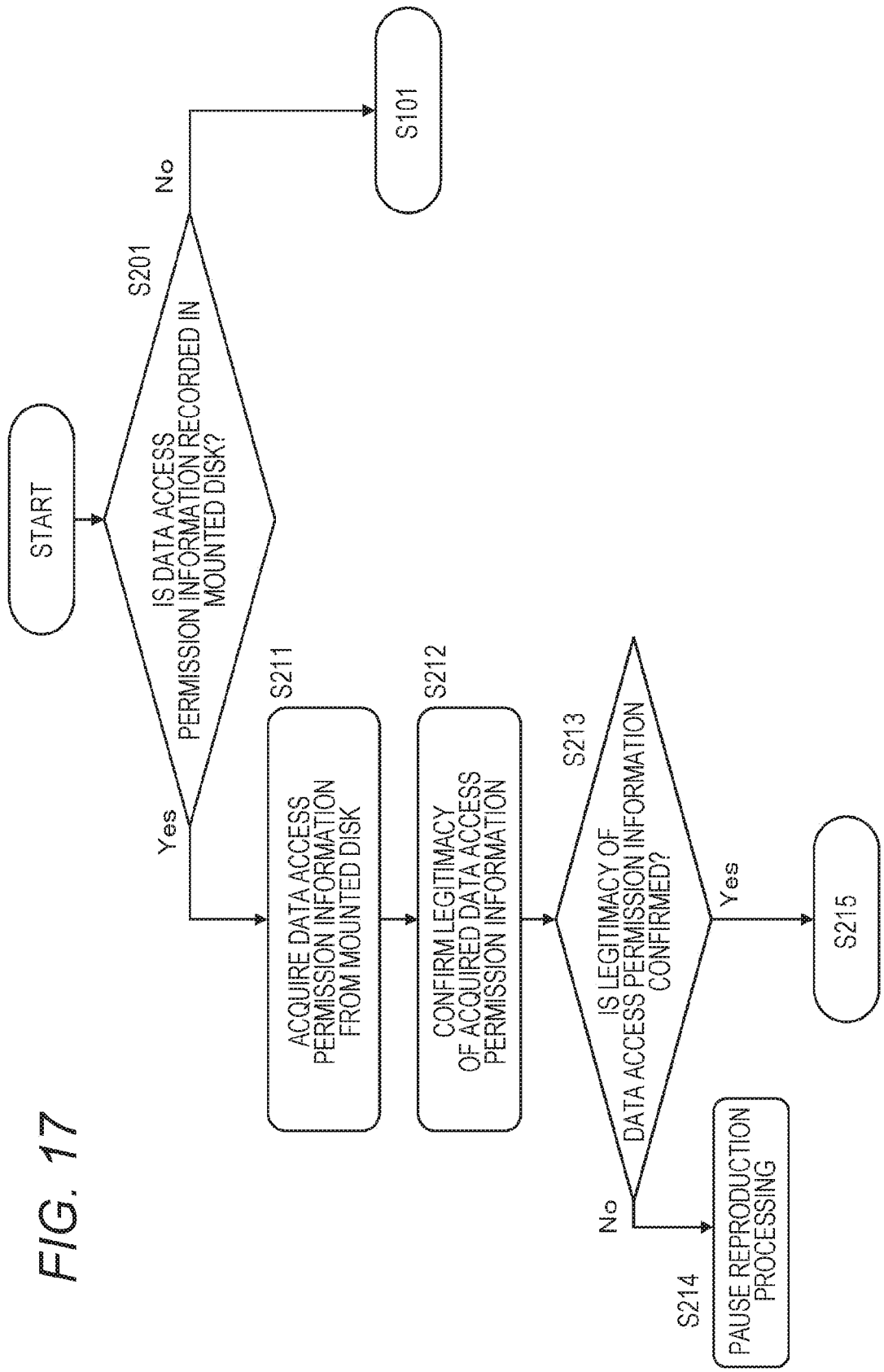
FIG. 17 is a diagram illustrating a flow chart which illustrates the processing sequence executed in the reproducing device.
Figure 18:
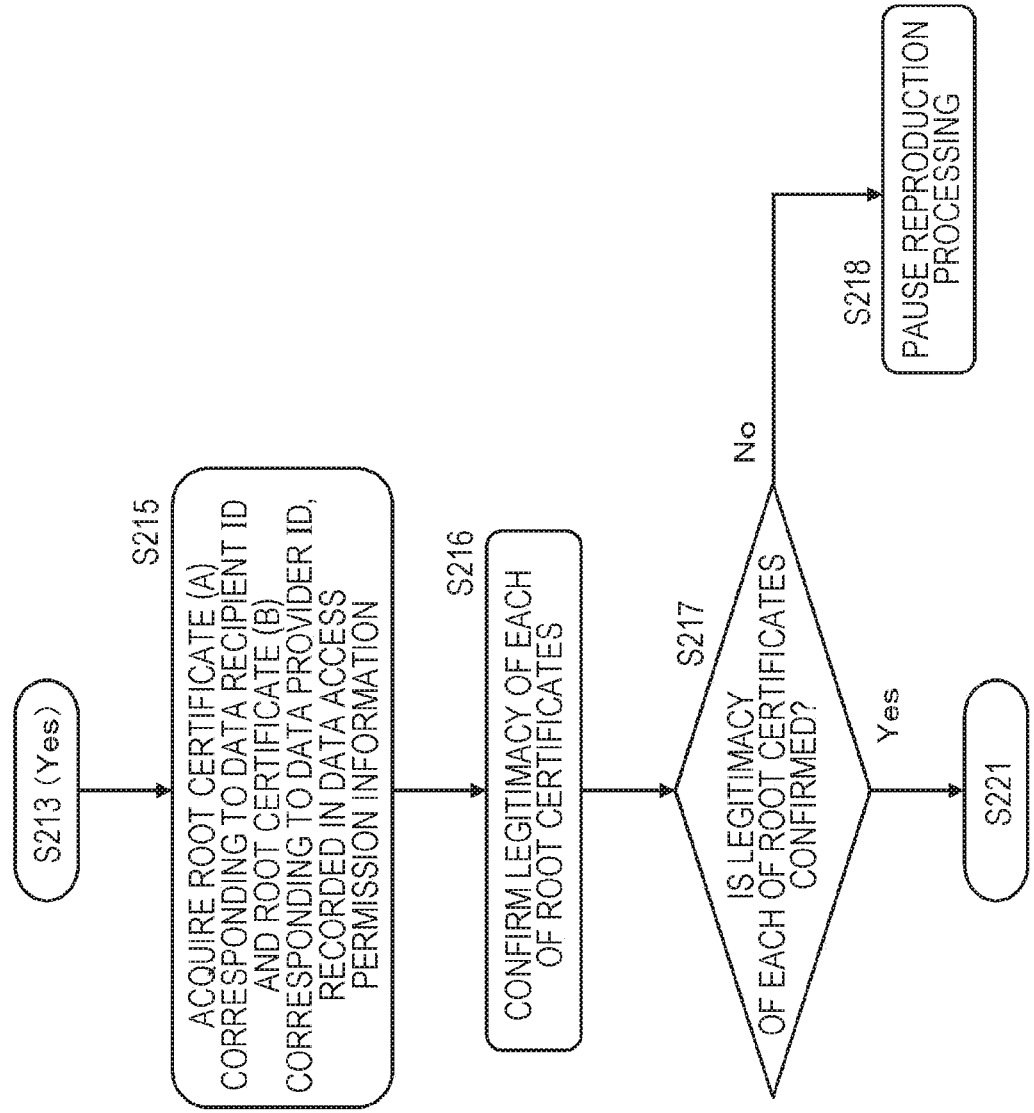
FIG. 18 is a diagram illustrating a flow chart which illustrates the processing sequence executed in the reproducing device.
Figure 19:
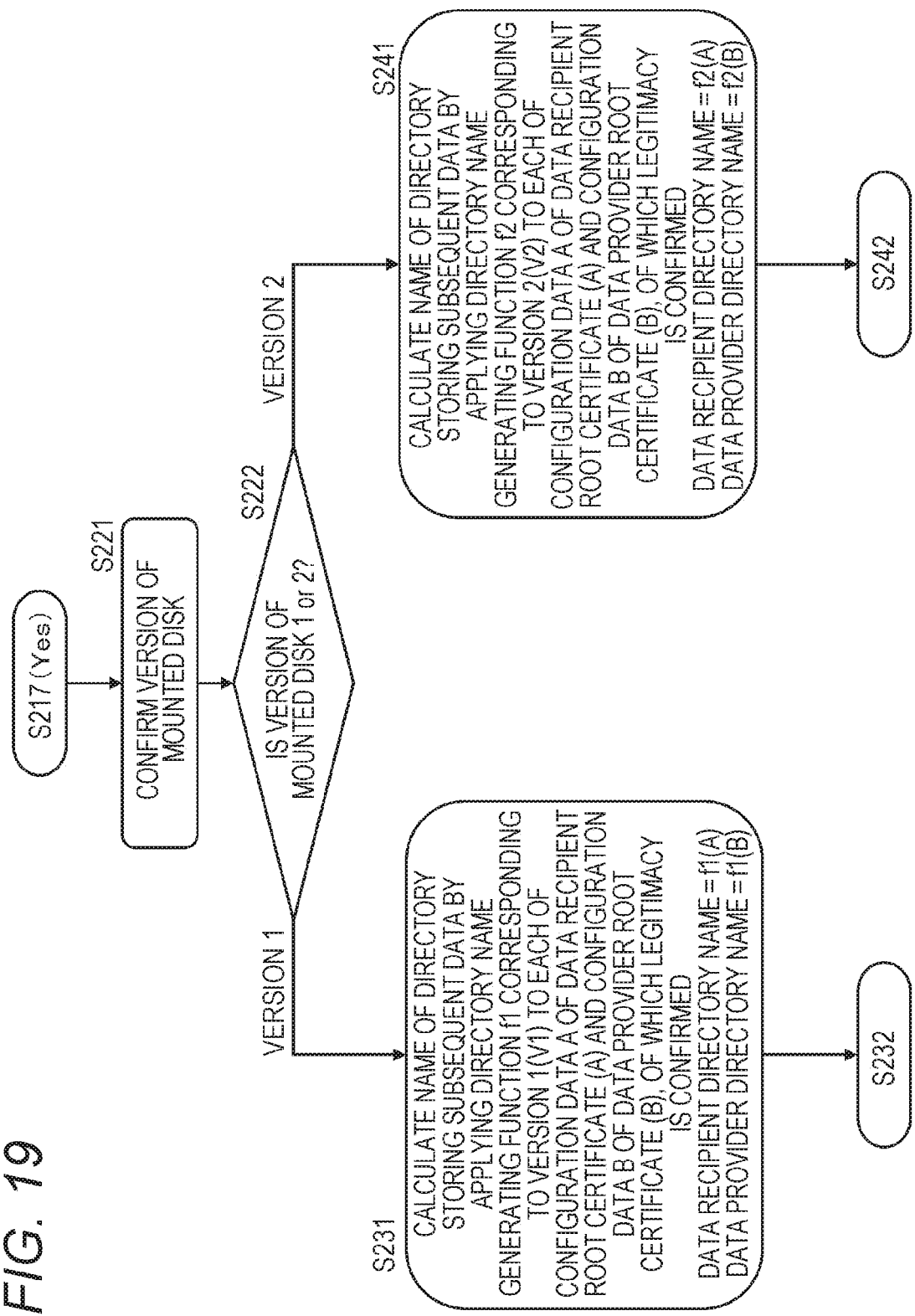
FIG. 19 is a diagram illustrating a flow chart which illustrates the processing sequence executed in the reproducing device.
Figure 20:
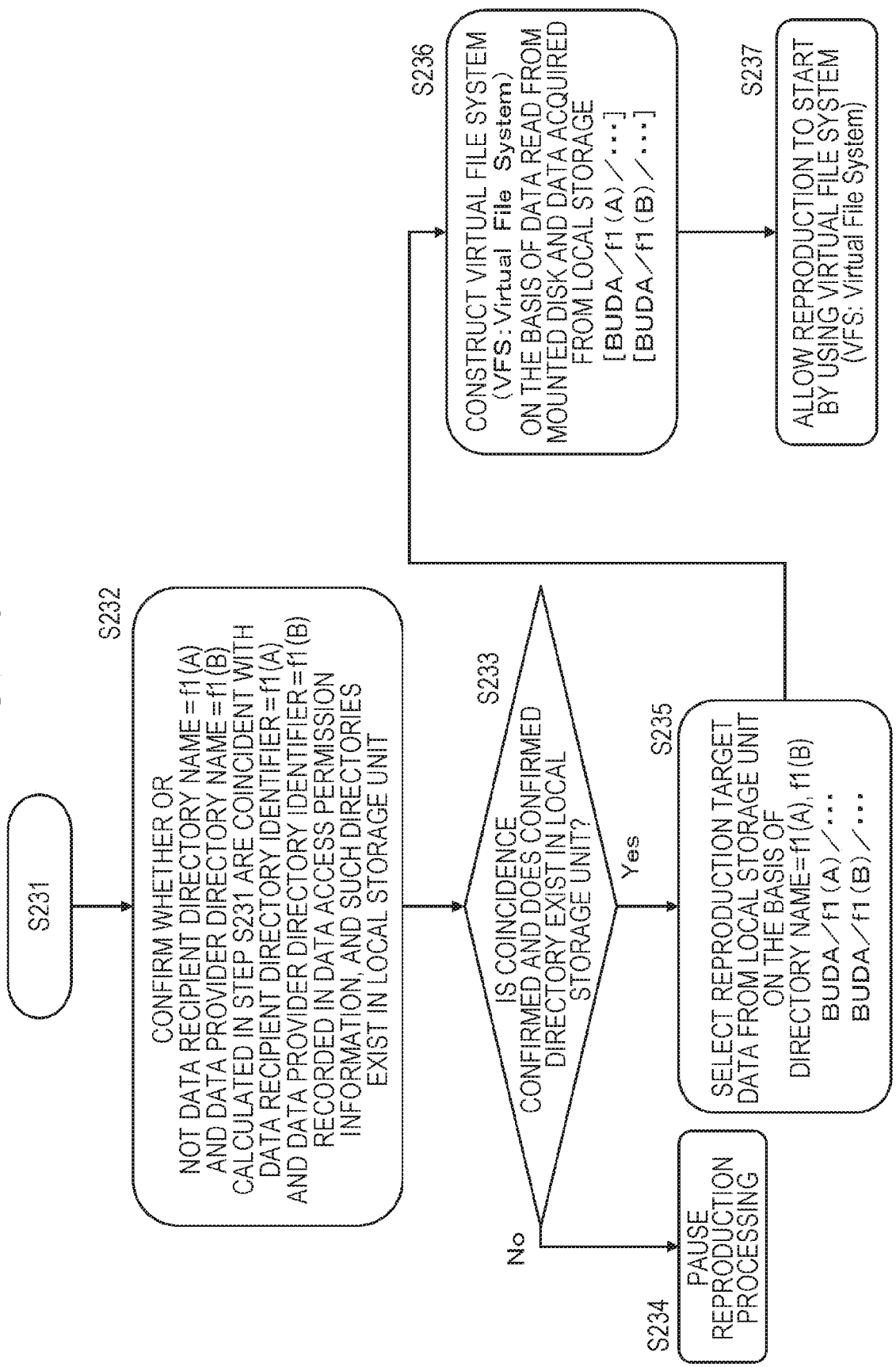
FIG. 20 is a diagram illustrating a flow chart which illustrates the processing sequence executed in the reproducing device.
Figure 21:
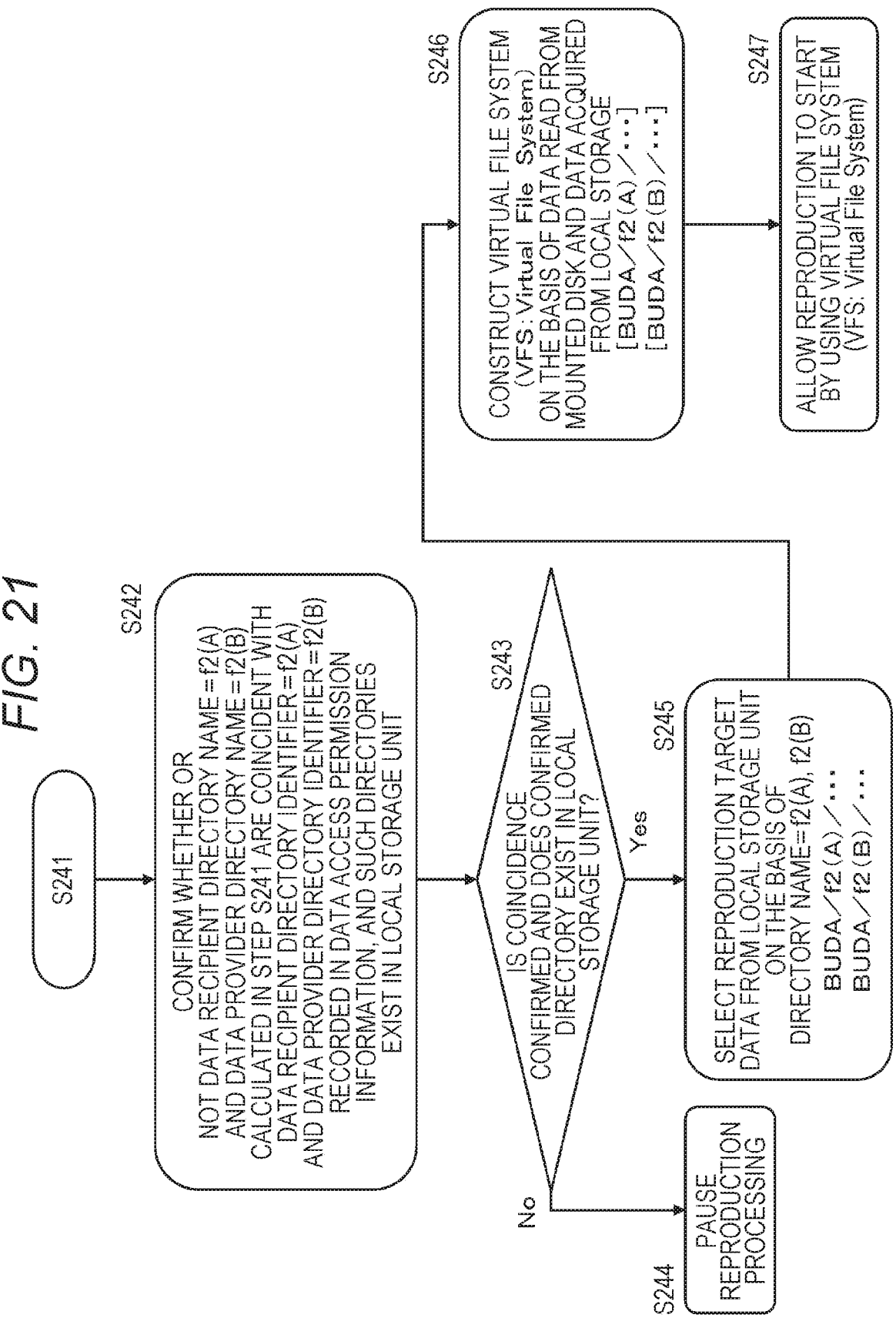
FIG. 21 is a diagram illustrating a flow chart which illustrates the processing sequence executed in the reproducing device.

Processing of each step illustrated in the flows of FIG. 15 and FIG. 16 will be sequentially described.

(Step S101)

First, the data processing unit of the reproducing device confirms the version of the disk mounted on the reproducing device in step S101.

The version of the disk can be read from information recorded in the disk.

The disk of the version 1 (V1), for example, is a disk storing a content formed of an HD image.

The disk of the version 2 (V2), for example, is a disk storing a content formed of a UHD image.

Furthermore, the example described above is an example, and the disks of the versions 1 and 2 are set to a disk storing different types of contents which are required to be subjected to different data processings at the time of being reproduced, for example, different decoding processings.

(Step S102)

In the disk version confirmation processing of step S101, in a case where it is confirmed that the mounted disk is the disk of the version 1, the process proceeds to step S111.

In contrast, in a case where it is confirmed that the mounted disk is the disk of the version 2, the process proceeds to step S121.

(Step S111)

The processings of steps S111 to S115 are processings in a case where the disk mounted on the reproducing device is the disk of the version 1.

Furthermore, hereinafter, the mounted disk is the disk storing the making content of the studio A, and will be described as a disk in which the root certificate (the public key certificate) of the studio A is recorded.

In step S111, the reproducing device acquires a root certificate (A) from the mounted disk of the version 1.

(Step S112)

In step S112, the data processing unit of the reproducing device performs the legitimacy confirmation with respect to the root certificate (A) acquired from the disk, and the confirmation processing is executed by verification processing of a signature which is recorded in the root certificate (A).

The signature is a signature which is generated by a secret key of an issuer of the root certificate (A), and the signature verification can be performed by using a public key of the issuer of the root certificate (A). The public key, for example, can be acquired from an external server which can be connected through a network, or the mounted disk.

(Step S113)

In step S113, in the legitimacy confirmation processing of the root certificate (A) executed in step S112, it is determined whether or not the legitimacy is confirmed. In a case where the legitimacy is not confirmed, the process proceeds to step S131. In a case where the legitimacy is confirmed, the process proceeds to step S114.

(Step S131)

In the legitimacy confirmation processing of the root certificate (A) executed in step S113, in a case where the legitimacy is not confirmed, in step S131, the reproduction processing is paused.

This is processing of pausing content reproduction using a disk in which an unauthorized root certificate is recorded.

(Step S114)

In the legitimacy confirmation processing of the root certificate (A) executed in step S112, in a case where the legitimacy is confirmed, processing of step S114 is executed.

In step S114, the reproducing device calculates a directory name of the subsequent data corresponding to the disk stored in the local storage unit 102 by applying a directory name generating function f1 corresponding to the version 1 prescribed in advance to the configuration data A of the root certificate (A) read from the disk.

That is, Directory Name=f1(A) is obtained.

According to the expression described above, a directory name of a directory in which the subsequent data corresponding to the mounted disk (V1) is recorded, is calculated.

(Step S115)

Next, the data processing unit of the reproducing device selects the subsequent data corresponding to the disk from the local storage unit, as the reproduction target data, according to the directory name (=f1(A)) of the directory storing the subsequent data calculated in step S115.

The subsequent data to be selected is the subsequent data corresponding to the disk of the version 1.

Thus, in a case where the disk corresponding to the version 1 is mounted on the reproducing device, the processings of steps S111 to S115 are executed, and the subsequent data corresponding to the disk of the version 1 is selected from the local storage unit, as the reproduction target data.

(Step S151)

In step S151, the data processing unit of the reproducing device constructs the virtual file system (VFS) on the basis of the data stored in the mounted disk and the data selected from the local storage unit.

In a case where the mounted disk is the disk of the version 1, all of the data items configuring the virtual file system (VFS) are the data items corresponding to the disk of the version 1.

(Step S152)

In step S152, the data processing unit of the reproducing device allows the data reproduction processing to which the virtual file system (VFS) constructed in step S151 is applied, to start.

In a case where the mounted disk is the disk of the version 1, all of the data items which are reproduced in the reproduction processing are the data items corresponding to the disk of the version 1.

Thus, in a case where the disk of the version 1 is mounted on the reproducing device 100, only the subsequent data corresponding to the version 1 can be selected from the directory of the local storage unit 102 in which subsequent data corresponding to the version 1 is recorded, the virtual file system (VFS) can be constructed, and the reproduction can be performed.

That is, the occurrence of an error that the subsequent data of the version 2 is erroneously selected can be prevented.

(Step S121)

Next, in a written decision of step S102, the processings of step S121 and thereafter, which are executed in a case where it is determined that the disk mounted on the reproducing device is the disk of the version 2, will be described.

The mounted disk is the disk storing the making content of the studio A, and is the disk in which the root certificate (the public key certificate) of the studio A is recorded.

In step S121, the reproducing device acquires the root certificate (A) from the mounted disk of the version 2.

(Step S122)

In step S122, the data processing unit of the reproducing device performs the legitimacy confirmation with respect to the root certificate (A) acquired from the disk, and the confirmation processing is executed by the verification processing of the signature which is recorded in the root certificate (A).

The signature is a signature which is generated by the secret key of the issuer of the root certificate (A), and the signature verification can be performed by using the public key of the issuer of the root certificate (A). The public key, for example, can be acquired from an external server which can be connected through a network, or the mounted disk.

(Step S123)

In step S123, in the legitimacy confirmation processing of the root certificate (A) executed in step S122, it is determined whether or not the legitimacy is confirmed. In a case where the legitimacy is not confirmed, the process proceeds to step S131. In a case where the legitimacy is confirmed, the process proceeds to step S124.

(Step S131)

In the legitimacy confirmation processing of the root certificate (A) executed in step S123, in a case where the legitimacy is not confirmed, in step S131, the reproduction processing is paused.

This is processing of pausing content reproduction using a disk in which an unauthorized root certificate is recorded.

(Step S124)

In the legitimacy confirmation processing of the root certificate (A) executed in step S122, in a case where the legitimacy is confirmed, processing of step S124 is executed.

In step S124, the reproducing device calculates a directory name of the subsequent data corresponding to the disk stored in the local storage unit 102 by applying a directory name generating function f2 corresponding to the version 2 prescribed in advance to the configuration data A of the root certificate read from the disk.

That is, Directory Name=f2(A) is obtained.

According to the expression described above, a directory name of a directory in which the subsequent data corresponding to the mounted disk (V2) is recorded, is calculated.

(Step S125)

Next, the data processing unit of the reproducing device selects the subsequent data corresponding to the disk from the local storage unit, as the reproduction target data, according to the directory name (=f2 (A)) of the directory storing the subsequent data calculated in step S124.

The subsequent data to be selected is the subsequent data corresponding to the disk of the version 2.

Thus, in a case where the disk corresponding to the version 2 is mounted on the reproducing device, the processings of steps S121 to S125 are executed, and the subsequent data corresponding to the disk of the version 2 is selected from the local storage unit, as the reproduction target data.

(Step S151)

In step S151, the data processing unit of the reproducing device constructs the virtual file system (VFS) on the basis of the data stored in the mounted disk and the data selected from the local storage unit.

In a case where the mounted disk is the disk of the version 2, all of the data items configuring the virtual file system (VFS) are the data items corresponding to the disk of the version 2.

(Step S152)

In step S152, the data processing unit of the reproducing device allows the data reproduction processing to which the virtual file system (VFS) constructed in step S151 is applied, to start.

In a case where the mounted disk is the disk of the version 2, all of the data items which are reproduced in the reproduction processing are the data items corresponding to the disk of the version 2.

Thus, in a case where the disk of the version 2 is mounted on the reproducing device 100, only the subsequent data corresponding to the version 2 can be selected from the directory of the local storage unit 102 in which subsequent data corresponding to the version 2 is recorded, the virtual file system (VFS) can be constructed, and the reproduction can be performed.

That is, the occurrence of an error that the subsequent data of the version 1 is erroneously selected can be prevented.

5-2. Processing Example 2: Reproduction Processing Example in Presence of Confirmation Processing of Data Access Permission Information Next, a reproduction processing example in the presence of the confirmation processing of the data access permission information will be described with reference to flow charts illustrated in FIG. 17 to FIG. 21.

Processing of each step of flows illustrated in FIG. 17 to FIG. 21 will be sequentially described.

(Step S201)

In step S201, the data processing unit of the reproducing device confirms whether or not the data access permission information is recorded in the mounted disk.

In a case where the data access permission information is recorded in the mounted disk, the process proceeds to step S211, and in a case where the data access permission information is not recorded in the mounted disk, the process proceeds to step S101.

Furthermore, there is also a case where the data access permission information is acquired from the server. Accordingly, in step S201, the data processing unit of the reproducing device performs processing of confirming the presence or absence of the data access permission information which can be used corresponding to the mounted disk by retrieving not only the disk but also the local storage unit, or by performing an inquiry with respect to the server.

(Step S101)

First, processing in a case where it is confirmed that there is no data access permission information corresponding to the mounted disk, will be described.

In a case where it is confirmed that there is no data access permission information corresponding to the mounted disk, the processings of steps S101 to S152 described above with reference to FIG. 15 and FIG. 16 are executed.

That is, the processing is processing in which the version of the disk mounted on the reproducing device is confirmed, a directory name of a directory in which the subsequent data corresponding to the disk of the confirmed version is recorded, is calculated, and data within the directory is selected and reproduced as configuration data of the virtual file system (VFS).

For example, in a case where the disk corresponding to the version 1 is mounted on the reproducing device, the processings of steps S111 to S115 are executed, and the subsequent data corresponding to the disk of the version 1 is selected from the local storage unit, as the reproduction target data.

In addition, in a case where the disk corresponding to the version 2 is mounted on the reproducing device, the processings of steps S121 to S125 are executed, and the subsequent data corresponding to the disk of the version 2 is selected from the local storage unit, as the reproduction target data.

After the processings are performed, access permission information is acquired from the disk, subsequent data to which access is permitted is selected as the configuration data of the virtual file system (VFS) on the basis of the access permission information, and the reproduction processing using the VFS is executed.

Next, in determination processing of step S201, the processings of step S211 and thereafter, which are executed in a case where it is confirmed that the data access permission information is recorded in the mounted disk, will be described.

(Step S211)

In a case where it is confirmed that there is the data access permission information corresponding to the mounted disk, in step S211, the data processing unit of the reproducing device acquires the data access permission information from the mounted disk, or other mediums, the server, or the like.

The data access permission information has the data configuration described above with reference to FIG. 12 and FIG. 14.

(Step S212)

In step S212, the data processing unit of the reproducing device performs the legitimacy confirmation with respect to the data access permission information acquired from the disk. The confirmation processing is executed by verification processing of a signature which is recorded in the data access permission information.

The signature is a signature which is generated by a secret key of an issuer of the data access permission information, and the signature verification can be performed by using a public key of the issuer of the data access permission information. The public key, for example, can be acquired from the server or the like providing the subsequent data. Alternatively, the public key may be set such that the public key can be acquired from the mounted disk. Furthermore, in a case where the issuer is a data provider, the public key of the issuer is recorded in a root certificate (B).

(Step S213)

In step S213, in the legitimacy confirmation processing of the data access permission information executed in step S212, it is determined whether or not the legitimacy is confirmed. In a case where the legitimacy is not confirmed, the process proceeds to step S214. In a case where the legitimacy is confirmed, the process proceeds to step S215.

(Step S214)

In the legitimacy confirmation processing of the data access permission information executed in step S212, in a case where the legitimacy is not confirmed, in step S214, the reproduction processing is paused.

This is processing of pausing content reproduction using a disk in which an unauthorized root certificate is recorded.

(Step S215)

In the legitimacy confirmation processing of the data access permission information executed in step S212, in a case where the legitimacy is confirmed, processing of step S215 is executed.

In step S215, the data processing unit of the reproducing device acquires two root certificates such as:

a root certificate (A) corresponding to a data recipient ID and a root certificate (B) corresponding to a data provider ID, which are recorded in the data access permission information, from the disk.

Furthermore, here, a data recipient will be described as the studio A, a data provider will be described as the studio B, the root certificate of the studio A will be described as the root certificate (A), and a root certificate of the studio B will be described as the root certificate (B).

(Step S216)

In step S216, the data processing unit of the reproducing device performs the legitimacy confirmation with respect to the root certificates such as:

the root certificate (A) corresponding to the data recipient ID and the root certificate (B) corresponding to the data provider ID, which are acquired from the disk, and the confirmation processing is executed by verification processing of a signature which is recorded in each of the root certificates.

The signature is a signature which is generated by a secret key of an issuer of the root certificate, and the signature verification can be performed by using a public key of the issuer of the root certificate. The public key, for example, can be acquired from an external server which can be connected through a network, or the mounted disk.

(Step S217)

In step S217, in the legitimacy confirmation processing of two root certificates such as:

the root certificate (A) corresponding to the data recipient ID and the root certificate (B) corresponding to the data provider ID, which is executed in step S216, it is determined whether or not the legitimacy of two root certificates is confirmed. In a case where the legitimacy is not confirmed, the process proceeds to step S218. In a case where the legitimacy is confirmed, the process proceeds to step S221.

(Step S218)

In the legitimacy confirmation processing of two root certificates such as:

the root certificate (A) corresponding to the data recipient ID and the root certificate (B) corresponding to the data provider ID, which is executed in step S216, in a case where the legitimacy of at least any one of two root certificates is not confirmed, in step S218, the reproduction processing is paused.

This is processing of pausing content reproduction using a disk in which an unauthorized root certificate is recorded.

(Step S221)

In the legitimacy confirmation processing of two root certificates such as:

the root certificate (A) corresponding to the data recipient ID and the root certificate (B) corresponding to the data provider ID, which is executed in step S216, in a case where the legitimacy of both of two root certificates is confirmed, the process proceeds to step S221.

In step S221, the data processing unit of the reproducing device confirms the version of the disk mounted on the reproducing device.

The version of the disk can be read from the information recorded in the disk.

The disk of the version 1 (V1), for example, is a disk storing a content formed of an HD image.

The disk of the version 2 (V2), for example, is a disk storing a content formed of a UHD image.

Furthermore, the example described above is an example, and the disks of the versions 1 and 2 are set to a disk storing different types of contents which are required to be subjected to different data processings at the time of being reproduced, for example, different decoding processings.

(Step S222)

In the disk version confirmation processing of step S221, in a case where it is confirmed that the mounted disk is the disk of the version 1, the process proceeds to step S231.

In contrast, in a case where it is confirmed that the mounted disk is the disk of the version 2, the process proceeds to step S241.

In a case where the mounted disk is the disk of the version 1, the processings of steps S231 to S237 are executed.

In contrast, in a case where the mounted disk is the disk of the version 2, the processings of steps S241 to S247 are executed.

First, the processings of steps S231 to S237 which are executed in a case where the mounted disk is the disk of the version 1, will be described.

(Step S231)

In step S231, the data processing unit of the reproducing device calculates the name of the directory storing the subsequent data by applying the directory name generating function f1 corresponding to the version 1 (V1) to each of configuration data A of a data recipient root certificate (A) and configuration data B of a data provider root certificate (B), of which the legitimacy is confirmed. That is, two directory names described below are calculated.

Data Recipient Directory Name=f1(A)

Data Provider Directory Name=f1(B)

(Step S232)

Next, in step S232, the data processing unit of the reproducing device confirms whether or not two directory names such as:

Data Recipient Directory Name=f1(A) and

Data Provider Directory Name=f1(B), which are calculated in step S231, are coincident with the directory identifiers such as:

Data Recipient Directory Identifier=f1(A) and

Data Provider Directory Identifier=f1(B), which are recorded in the data access permission information.

Further, in a case where it is confirmed that the directory names are coincident with the directory identifiers, it is confirmed whether or not two such directories exist in the local storage unit.

Furthermore, the data access permission information corresponding to the version 1 described above with reference to FIG. 14 is recorded in the disk of the version 1.

A directory identifier (a directory name) which is calculated by applying the directory name calculation function f1 corresponding to the version 1, is recorded as the directory identifier recorded in the data access permission information corresponding to the version 1.

Furthermore, in step S232, the reproducing device confirms whether or not the calculated directory name is coincident with the directory identifier recorded in the data access permission information, and then, two such directories exist in the local storage unit.

(Step S233)

In a case where it is confirmed that two directory names such as:

Data Recipient Directory Name=f1(A) and
Data Provider Directory Name=f1(B), which are calculated in step S231, are coincident with the directory identifiers such as:

Data Recipient Directory Identifier=f1(A) and
Data Provider Directory Identifier=f1(B), which are recorded in the data access permission information, and two such directories exist in the local storage unit, the process proceeds to step S235, and in the opposite case, the process proceeds to step S234.

(Step S234)

In the processings of steps S232 to S233, in a case where it is confirmed that the calculated directory name is not recorded in the data access permission information or the calculated directory name does not exist in the local storage unit, in step S234, the reproduction processing is paused.

(Step S235)

In the processings of steps S232 to S233, in a case where it is confirmed that the calculated directory name is recorded in the data access permission information and exists in the local storage unit, the processing of step S235 is executed.

In step S235, directories having two directory names such as:

Data Recipient Directory Name=f1(A) and
Data Provider Directory Name=f1(B), which are calculated in step S231, are selected from the local storage unit, and data set within two such directories is selected as the reproduction target data.

Furthermore, all of the data items set in the directories such as:

Data Recipient Directory Name=f1(A) and
Data Provider Directory Name=f1(B), are the subsequent data corresponding to the disk of the version 1. Thus, in a case where the disk of the version 1 is mounted on the reproducing device, the processings of steps S231 to S235 are executed, and the subsequent data corresponding to the disk of the version 1 is selected from the local storage unit, as the reproduction target data.

(Step S236)

In step S236, the data processing unit of the reproducing device constructs the virtual file system (VFS) on the basis of the data stored in the mounted disk and the data selected from the local storage unit.

In a case where the mounted disk is the disk of the version 1, all of the data items configuring the virtual file system (VFS) are the data corresponding to the disk of the version 1.

(Step S237)

In step S237, the data processing unit of the reproducing device allows the data reproduction processing to which the virtual file system (VFS) constructed in step S236 is applied, to start.

In a case where the mounted disk is the disk of the version 1, all of the data items reproduced in the reproduction processing are the data corresponding to the disk of the version 1.

(Step S241)

Next, in a written decision of step S222, the processings of step S241 and thereafter, which are executed in a case where it is determined that the disk mounted on the reproducing device is the disk of the version 2, will be described.

In step S241, the data processing unit of the reproducing device calculates the name of the directory storing the subsequent data by applying the directory name generating function f2 corresponding to the version 2 (V2) to each of the configuration data A of the data recipient root certificate (A) and the configuration data B of the data provider root certificate (B), of which the legitimacy is confirmed. That is, two directory names described below are calculated.

Data Recipient Directory Name=f2 (A)
Data Provider Directory Name=f2(B)

(Step S242)

Next, in step S242, the data processing unit of the reproducing device confirms whether or not two directory names such as:

Data Recipient Directory Name=f2(A) and
Data Provider Directory Name=f2(B), which are calculated in step S241, are coincident with the directory identifiers such as:

Data Recipient Directory Identifier=f2(A) and
Data Provider Directory Identifier=f2(B), which are recorded in the data access permission information.

Furthermore, the data access permission information corresponding to the version 2 described above with reference to FIG. 12 is recorded in the disk of the version 2.

A directory identifier (a directory name) which is calculated by applying the directory name calculation function f2 corresponding to the version 2, is recorded as the directory identifier recorded in the data access permission information corresponding to the version 2.

Furthermore, in step S242, the reproducing device confirms whether or not the calculated directory name is coincident with the directory identifier recorded in the data access permission information, and then, two such directories exist in the local storage unit.

(Step S243)

In a case where it is confirmed that two directory names such as:

Data Recipient Directory Name=f2(A) and
Data Provider Directory Name=f2(B), which are calculated in step S241, are coincident with the directory identifiers such as:

Data Recipient Directory Identifier=f2(A) and
Data Provider Directory Identifier=f2(B), which are recorded in the data access permission information, and two such directories exist in the local storage unit, the process proceeds to step S245, in the opposite case, the process proceeds to step S244.

(Step S244)

In the processings of steps S242 to S243, in a case where it is confirmed that the calculated directory name is not recorded in the data access permission information or the calculated directory name does not exist in the local storage unit, in step S244, the reproduction processing is paused.

(Step S245)

In the processings of steps S242 to S243, in a case where it is confirmed that the calculated directory name is recorded in the data access permission information and exists in the local storage unit, the processing of step S245 is executed.

In step S245, directories having two directory names such as:

Data Recipient Directory Name=f2(A) and
Data Provider Directory Name=f2(B), which are calculated in step S241, are selected from the local storage unit, and data set within two such directories is selected as the reproduction target data.

Furthermore, all of the data items set in the directories such as:

Data Recipient Directory Name=f2 (A) and
Data Provider Directory Name=f2 (B), are the subsequent data corresponding to the disk of the version 2. Thus, in a case where the disk of the version 2 is mounted on the reproducing device, the processings of steps S241 to S245 are executed, and the subsequent data corresponding to the disk of the version 2 is selected from the local storage unit, as the reproduction target data.

(Step S246)

In step S246, the data processing unit of the reproducing device constructs the virtual file system (VFS) on the basis of the data stored in the mounted disk and the data selected from the local storage unit.

In a case where the mounted disk is the disk of the version 2, all of the data items configuring the virtual file system (VFS) are the data corresponding to the disk of the version 2.

(Step S247)

In step S237, the data processing unit of the reproducing device allows the data reproduction processing to which the virtual file system (VFS) constructed in step S246 is applied, to start.

In a case where the mounted disk is the disk of the version 2, all of the data items reproduced in the reproduction processing are the data corresponding to the disk of the version 2.

Thus, in the reproduction processing using the data access permission information, in a case where the disk of the version 1 is mounted, the subsequent data corresponding to the disk of the version 1 can be acquired with respect to the data of the data provider directory acquired from the local storage unit. In a case where the disk of the version 2 is mounted, all of the subsequent data items corresponding to the disk of the version 2 can be reliably acquired.

The occurrence of an error that subsequent data of a different version is erroneously selected can be prevented.

6. Hardware Configuration Example of Information Processing Device

Figure 22:
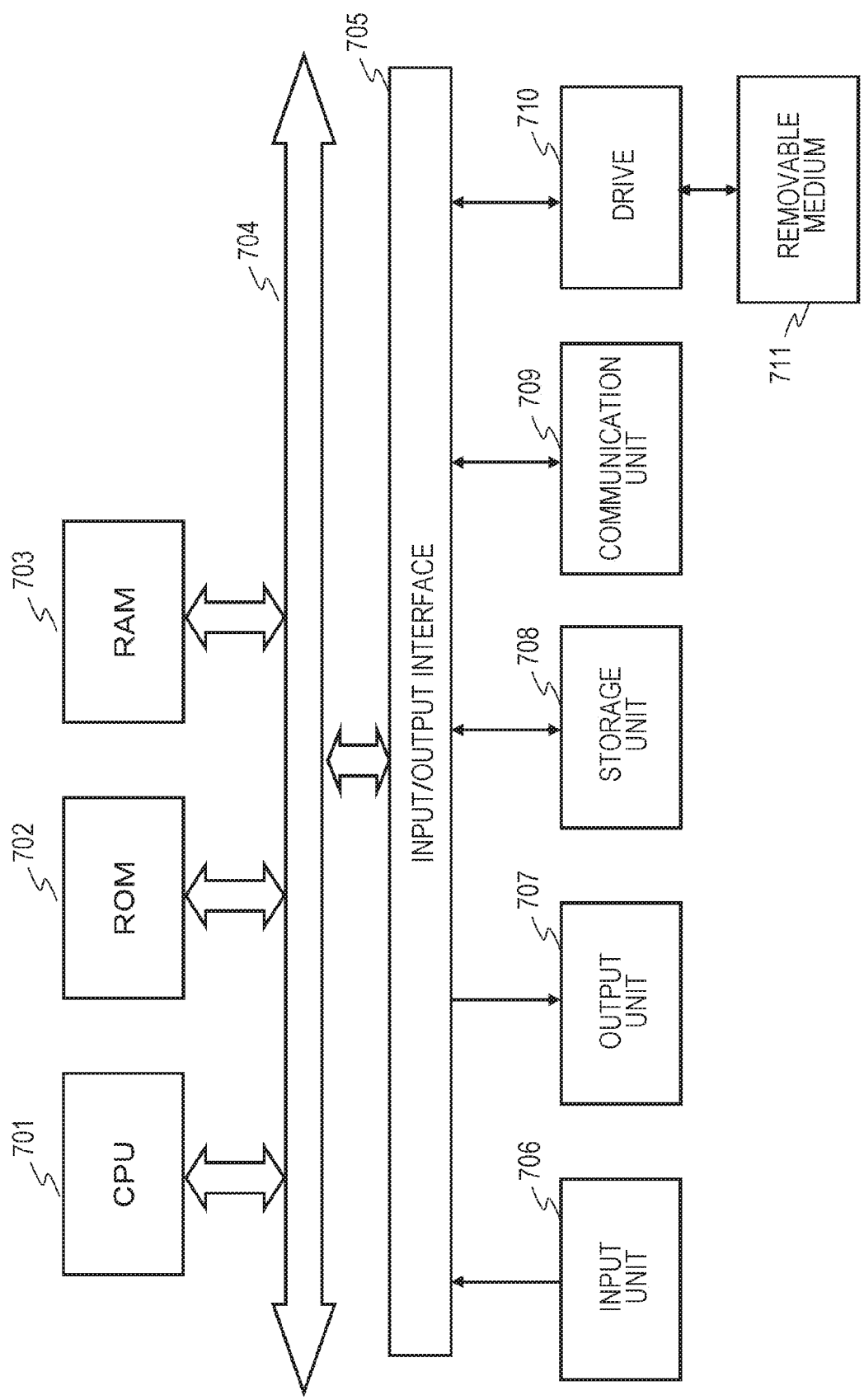
FIG. 22 is a diagram illustrating a hardware configuration example of an information processing device.

Finally, a hardware configuration example of the reproducing device executing the processing described above will be described with reference to FIG. 22.

A central processing unit (CPU) 701 functions as the data processing unit executing various processings according to a program stored in a read only memory (ROM) 702 or a storage unit 708. For example, the central processing unit (CPU) 701 executes the data reproduction processing described in each of the above examples, communication processing with respect to the server, recording processing of the data received from the server with respect to the storage unit, or the like. The program executed by the CPU 701, data, or the like is suitably stored in a random access memory (RAM) 703. The CPU 701, the ROM 702, and the RAM 703 are connected to each other through a bus 704.

The CPU 701 is connected to an input/output interface 705 through the bus 704, and an input unit 706 formed of various switches, a keyboard, a mouse, a microphone, and the like, and an output unit 707 formed of a display, a speaker, and the like are connected to the input/output interface 705. The CPU 701 executes various processings corresponding to an instruction input from the input unit 706, and outputs a processing result, for example, to the output unit 707.

The storage unit 708 connected to the input/output interface 705, for example, is formed of a hard disk or the like, and stores the program executed by the CPU 701, or various data items. A communication unit 709 performs communication with respect to an external device through a network such as the Internet or a local area network.

A drive 710 connected to the input/output interface 705 drives a removable medium 711 such as a magnetic disk, an optical disk, a magneto optical disk, or a semiconductor memory, and acquires various data items such as a content or key information which is recorded. For example, the decoding processing, the reproduction processing, or the like of the content is performed by using the acquired content or key data, according to the reproducing program executed by the CPU.

7. Summary of Configuration of Present Disclosure

As described above, the examples of the present disclosure have been described in detail with reference to specific examples. However, it is obvious that a person skilled in the art is able to perform correction or substitution with respect to the examples within a range not departing from the gist of the present disclosure. That is, the present invention has been disclosed as an example, and is not restrictively interpreted. The gist of the present disclosure is determined with reference to claims.

Furthermore, the technology disclosed herein is capable of having the following configurations.

(1) An information processing device, including:

a data processing unit configured to readout and reproduce data recorded in an information recording medium, and data stored in a local storage unit which is different from the information recording medium, wherein the data processing unit, executes processing of selecting data associated with the information recording medium from the local storage unit, as reproduction target data, executes directory name calculation processing in which a conversion function corresponding to a version of the information recording medium is applied to configuration data of a root certificate recorded in the information recording medium, at the time of performing the processing of selecting the reproduction target data, and selects data which is recorded in a directory having a calculated directory name from the local storage unit, as the reproduction target data.

(2) The information processing device according to (1), wherein the root certificate is a public key certificate which is associated with a content stored in the information recording medium, and the data processing unit executes the directory name calculation processing in which the conversion function corresponding to the version of the information recording medium is applied to configuration data of the public key certificate.

(3) The information processing device according to (2), wherein the root certificate is a public key certificate of a maker of the content stored in the information recording medium.

(4) The information processing device according to any of (1) to (3), wherein the information recording medium is any one of an information recording medium (V1) of a version 1 and an information recording medium (V2) of a version 2 which are required for different data processing in reproduction processing, and the data processing unit, executes directory name calculation processing in which a conversion function f1 corresponding to the version 1 is applied to configuration data of a root certificate recorded in the information recording medium (V1), in a case where the information recording medium (V1) of the version 1 is mounted on the information processing device, and executes directory name calculation processing in which a conversion function f2 corresponding to the version 2 is applied to configuration data of a root certificate recorded in the information recording medium (V2), in a case where the information recording medium (V2) of the version 2 is mounted on the information processing device.

(5) The information processing device according to (4), wherein the conversion function f1 corresponding to the version 1 is a hash function h1, and the conversion function f2 corresponding to the version 2 is f2=h1(h1), which is a function obtained by repeating the hash function h1 twice.

(6) The information processing device according to (4), wherein the conversion function f1 corresponding to the version 1 is a hash function h1, and the conversion function f2 corresponding to the version 2 is a hash function h2 which is different from the hash function h1.

(7) The information processing device according to (4), wherein the conversion function f1 corresponding to the version 1 is a hash function h1, and the conversion function f2 corresponding to the version 2 is f2=h1∥h1, which is a function for calculating a concatenation value of a calculation value of the hash function h1.

(8) The information processing device according to any of (1) to (7), wherein the data processing unit, further acquires data access permission information from the information recording medium, or other mediums or a server, and selects data recorded in a directory having a directory name which is identical to a data provider directory identifier recorded in the data access permission information from the local storage unit, as the reproduction target data.

(9) The information processing device according to (8), wherein a data provider ID is recorded in the data access permission information, and the data processing unit, executes the directory name calculation processing in which the conversion function corresponding to the version of the information recording medium is applied to configuration data of a data provider public key certificate which is a root certificate of a data provider, and selects data which is recorded in a directory having a calculated directory name from the local storage unit, as the reproduction target data.

(10) The information processing device according to (9), wherein the information recording medium is any one of an information recording medium (V1) of a version 1 and an information recording medium (V2) of a version 2 which are required for different data processing in reproduction processing, and the data processing unit, executes directory name calculation processing in which a conversion function f1 corresponding to the version 1 is applied to configuration data of the root certificate of the data provider, in a case where the information recording medium (V1) of the version 1 is mounted on the information processing device, and executes directory name calculation processing in which a conversion function f2 corresponding to the version 2 is applied to the configuration data of the root certificate of the data provider, in a case where the information recording medium (V2) of the version 2 is mounted on the information processing device.

(11) The information processing device according to (10), wherein a directory name which is calculated by applying the conversion function f1 corresponding to the version 1 is recorded in data access permission information (V1) corresponding to the information recording medium (V1) of the version 1, as a directory identifier, a directory name which is calculated by applying the conversion function f2 corresponding to the version 2 is recorded in data access permission information (V2) corresponding to the information recording medium (V2) of the version 2, as a directory identifier, and the data processing unit, confirms whether or not the directory name calculated by applying the conversion function corresponding to the version to the configuration data of the root certificate of the data provider is coincident with the directory identifier recorded in the data access permission information, and selects data which is recorded in a directory having a calculated directory name from the local storage unit, as the reproduction target data, in a case where it is confirmed that the directory name is coincident with the directory identifier.

(12) The information processing device according to (10) or (11), wherein the conversion function f1 corresponding to the version 1 is a hash function h1, and the conversion function f2 corresponding to the version 2 is f2=h1(h1), which is a function obtained by repeating the hash function h1 twice.

(13) The information processing device according to (10) or (11), wherein the conversion function f1 corresponding to the version 1 is a hash function h1, and the conversion function f2 corresponding to the version 2 is a hash function h2 which is different from the hash function h1.

(14) The information processing device according to (10) or (11), wherein the conversion function f1 corresponding to the version 1 is a hash function h1, and the conversion function f2 corresponding to the version 2 is f2=h1∥h1, which is a function for calculating a concatenation value of a calculation value of the hash function h1.

(15) An information recording medium, which is a second information recording medium configuring a local storage unit storing subsequent data associated with a plurality of different first information recording mediums, wherein the subsequent data is recorded in a directory having a directory name which is generated by applying a conversion function corresponding to a version of the first information recording medium to root certificate configuration data corresponding to a content which is recorded in the first information recording medium associated with the subsequent data, and a reproducing device configured to execute reproduction processing with respect to data recorded in the first information recording medium is capable of selecting data recorded in a directory having a directory name which is calculated by applying the conversion function, as subsequent data of a reproduction target.

(16) An information recording medium, in which reproduction target data and data access permission information are recorded, wherein a directory name which is calculated by applying a conversion function corresponding to a version to configuration data of a root certificate of a data provider is recorded in the data access permission information, as a directory identifier, and a reproducing device configured to execute reproduction processing with respect to data recorded in the information recording medium, confirms whether or not the directory name which is calculated by applying the conversion function corresponding to the version to the configuration data of the root certificate of the data provider is coincident with the directory identifier which is recorded in the data access permission information, and is capable of selecting data which is recorded in a directory having a calculated directory name from a local storage unit different from the information recording medium, as reproduction target data, in a case where it is confirmed that the directory name is coincident with the directory identifier.

(17) An information processing method, which is executed in an information processing device, wherein the information processing device includes a data processing unit configured to read out and reproduce data recorded in an information recording medium, and data stored in a local storage unit which is different from the information recording medium, and the data processing unit, executes processing of selecting data associated with the information recording medium from the local storage unit, as reproduction target data, executes directory name calculation processing in which a conversion function corresponding to a version of the information recording medium is applied to configuration data of a root certificate recorded in the information recording medium, at the time of performing the processing of selecting the reproduction target data, and selects data which is recorded in a directory having a calculated directory name from the local storage unit, as the reproduction target data.

(18) A program, which allows information processing to be executed in an information processing device, wherein the information processing device includes a data processing unit configured to read out and reproduce data recorded in an information recording medium, and data stored in a local storage unit which is different from the information recording medium, and the program allows the data processing unit to execute processing of selecting data associated with the information recording medium from the local storage unit, as reproduction target data, execute directory name calculation processing in which a conversion function corresponding to a version of the information recording medium is applied to configuration data of a root certificate recorded in the information recording medium, at the time of performing the processing of selecting the reproduction target data, and execute processing of selecting data which is recorded in a directory having a calculated directory name from the local storage unit, as the reproduction target data.

In addition, a set of processings described herein can be executed by hardware, software, or a complex configuration of both of the hardware and the software. In a case where the processing is executed by the software, a program in which a processing sequence is recorded, can be executed by being installed in a memory of a computer embedded in dedicated hardware or a program can be executed by being installed in a general-purpose computer in which various processings can be executed. For example, the program can be recorded in advance in a recording medium. The program can be received through a network such as a local area network (LAN) or the Internet, and can be installed in the recording medium such as a hard disk to be embedded, in addition to a case where the program is installed in the computer from the recording medium.

Furthermore, various processings described herein may be executed not only chronologically according to the above description but also parallelly or individually according to the processing ability of a device executing the processing or as necessary. In addition, herein, the system has a configuration in which a plurality of devices is logically set, and the device of each configuration is not limited to being in the same housing.

INDUSTRIAL APPLICABILITY

As described above, according to the configuration of an example of the present disclosure, it is possible to reliably acquire the subsequent data corresponding to the information recording medium from the local storage unit, to construct the virtual file system (VFS), and to execute the data reproduction.

Specifically, the data processing unit configured to read out and reproduce the data recorded in the information recording medium, and the data stored in the local storage unit which is different from the information recording medium is provided. The data processing unit, executes the processing of selecting the data associated with the information recording medium from the local storage unit, as the reproduction target data, executes the directory name calculation processing in which the conversion function corresponding to the version of the information recording medium is applied to the configuration data of the root certificate recorded in the information recording medium at the time of performing the processing of selecting the reproduction target data, and selects the data which is recorded in the directory having the calculated directory name from the local storage unit, as the reproduction target data.

According to this configuration, the subsequent data corresponding to the information recording medium can be reliably acquired from the local storage unit, the virtual file system (VFS) can be constructed, and the data reproduction can be executed.

REFERENCE SIGNS LIST

100 Reproducing device
101 Data processing unit
102 Local storage unit
103 Drive
104 Memory
105 Communication IF
106 Display unit
130 Server
131 Data processing unit
132 Communication IF
200 Information recording medium
201 Content
202 Usage control information
203 Root certificate
204 Data access permission information 205 Other data
320 Application program
321 Subsequent data retrieval information
401 Root directory
402 BUDA root directory
403 Studio directory
404 Disk directory
501 Root directory
502 BUDA root directory
503 to 506 Studio & version directory
511 to 514,552 Disk directory
701 CPU
702 ROM
703 RAM
704 Bus
705 Input/output interface
706 Input unit
707 Output unit
708 Storage unit
709 Communication unit
710 Drive
711 Removable medium

The invention claimed is:

1. An information processing device, comprising:
circuitry configured to:
read out and reproduce first data from an information recording medium, wherein
the information recording medium is one of an information recording medium (V1) of a version 1 or an information recording medium (V2) of a version 2, and
the V1 and the V2 are required for different data processing operations in a reproduction processing operation;
execute a directory name calculation processing operation in which a conversion function f1 corresponding to the version 1, is applied to configuration data of a first root certificate recorded in the information recording medium (V1), when the information recording medium (V1) of the version 1 is mounted on the information processing device,
wherein the conversion function f1 is a hash function h1; and
execute the directory name calculation processing operation in which a conversion function f2, corresponding to the version 2, is applied to configuration data of a second root certificate recorded in the information recording medium (V2), when the information recording medium (V2) of the version 2 is mounted on the information processing device,
wherein the conversion function f2 is one of
f2=h1(h1), wherein f2 is obtained by repetition of the hash function h1 twice,
a hash function h2 different from the hash function h1, or
f2=h1||h1, wherein f2 is for calculation of a concatenation value of a calculation value of the hash function h1; and
select second data corresponding to the information recording medium, as reproduction target data, from a directory having a calculated directory name, wherein
the directory is a result of the directory name calculation processing operation,
the directory is in a local storage unit, and
the local storage unit is different from the information recording medium.

2. The information processing device according to claim 1, wherein
the first root certificate is a public key certificate,
the public key certificate is associated with content stored in the information recording medium (V1), and
the circuitry is further configured to execute the directory name calculation processing operation in which the conversion function f1, corresponding to the version 1, of the information recording medium (V1) is applied to configuration data of the public key certificate.

3. The information processing device according to claim 2, wherein the first root certificate is the public key certificate of a maker of the content stored in the information recording medium (V1).

4. The information processing device according to claim 1, wherein the circuitry is further configured to:
acquire data access permission information from one of the information recording medium or a server; and
select the second data recorded in the directory having the calculated directory name, wherein the calculated directory name is identical to a data provider directory identifier recorded in the data access permission information from the local storage unit.

5. The information processing device according to claim 1, wherein
a first data provider identifier, of a first data provider, is recorded in data access permission information corresponding to the information recording medium (V1) of the version 1,
a second data provider identifier, of a second data provider, is recorded in data access permission information corresponding to the information recording medium (V2) of the version 2, and
the circuitry is further configured to execute the directory name calculation processing operation in which one of:
the conversion function f1, corresponding to the version 1, of the information recording medium (V1) is applied to configuration data of a first data provider public key certificate which is the first root certificate of the first data provider, or
the conversion function f2, corresponding to the version 2, of the information recording medium (V2 is applied to configuration data of a second data provider public key certificate which is the second root certificate of the second data provider.

6. The information processing device according to claim 5, wherein
the directory name calculated by application of the conversion function f1 is recorded in the data access permission information corresponding to the information recording medium (V1) of the version 1, as a first directory identifier,
the directory name calculated by application of the conversion function f2 is recorded in the data access permission information corresponding to the information recording medium (V2) of the version 2, as a second directory identifier, and
the circuitry is further configured to:
confirm whether the directory name calculated by one of the application of
the conversion function f1, corresponding to the version 1, to the configuration data of the first root certificate of the first data provider or the application of the conversion function f2, corresponding to the version 2, to the configuration data of the second root certificate of the second data provider is coincident with one of the first directory identifier or the second directory identifier; and select the second data, as the reproduction target data, from the directory having the calculated directory name when it is confirmed that the calculated directory name is coincident with one of the first directory identifier or the second directory identifier.

7. An information recording device, comprising:
a local storage unit configured to store data associated with a plurality of different first information recording devices, wherein:
the data is recorded in a directory having a directory name,
the directory name is generated by application of a conversion function f1, corresponding to a version 1, of a first information recording device (V1) of the plurality of different first information recording devices to first root certificate configuration data,
the conversion function f1 is a hash function,
the directory name is further generated by application of a conversion function f2, corresponding to a version 2, of a second information recording device (V2) of the plurality of different first information recording devices to second root certificate configuration data,
the conversion function f2 is one of
f2=h1(h1), wherein f2 is obtained by repetition of the hash function h1 twice,
a hash function h2 different from the hash function h1, or
f2=h1∥h1, wherein f2 is for calculation of a concatenation value of
a calculation value of the hash function h1,
the first root certificate configuration data corresponds to content which is recorded in the first information recording device,
the second root certificate configuration data corresponds to content which is recorded in the second information recording device,
the content which is recorded in the first information recording device and the content which is recorded in the second information recording device are is associated with the data, and
circuitry executes a reproduction processing operation by selection of the data recorded in the directory as reproduction target data.

8. A first information recording device, comprising:
a storage unit configured to record reproduction target data and data access permission information, wherein:
a directory name which is calculated by application of a conversion function f1, corresponding to a version 1, of the first information recording device to configuration data of a first root certificate of a first data provider,
the conversion function f1 is a hash function,
a directory name which is calculated by application of a conversion function f2, corresponding to a version 2, of a second information recording device to configuration data of a second root certificate of a second data provider,
the conversion function f2 is one of
f2=h1(h1), wherein f2 is obtained by repetition of the hash function h1 twice,
a hash function h2 different from the hash function h1, or
f2=h1∥h1, wherein f2 is for calculation of a concatenation value of
a calculation value of the hash function h1,
a directory identifier is recorded in the data access permission information, and
circuitry that:
confirms whether the directory name is coincident with the directory identifier, and
selects data recorded in a directory, as reproduction target data,
when the directory name is coincident with the directory identifier,
the directory is in a local storage unit, and
the local storage unit is different from the first information recording device.

9. An information processing method, comprising:
in an information processing device,
reading out and reproducing first data from an information recording medium, wherein
the information recording medium is one of an information recording medium (V1) of a version 1 or an information recording medium (V2) of a version 2, and
the V1 and the V2 are required for different data processing operations in a reproduction processing operation;
executing a directory name calculation processing in which a conversion function f1, corresponding to the version 1, is applied to configuration data of a first root certificate recorded in the information recording medium (V1), when the information recording medium (V1) of the version 1 is mounted on the information processing device,
wherein the conversion function f1 is a hash function h1; and
executing the directory name calculation processing in which a conversion function f2, corresponding to the version 2, is applied to configuration data of a second root certificate recorded in the information recording medium (V2), when the information recording medium (V2) of the version 2 is mounted on the information processing device,
wherein the conversion function f2 is one of
f2=h1(h1), wherein f2 is obtained by repetition of the hash function h1 twice,
a hash function h2 different from the hash function h1,
or f2=h1∥h1, wherein f2 is for calculation of a concatenation value of a calculation value of the hash function h1; and
selecting second data corresponding to the information recording medium, as reproduction target data, from a directory having a calculated directory name, wherein
the directory is a result of the directory name calculation processing,
the directory is in a local storage unit, and
the local storage unit is different from the information recording medium.

10. A non-transitory computer-readable medium having stored thereon, computer-executable instructions that, when executed by an information processing device, cause the information processing device to execute operations, the operations comprising:
reading out and reproducing first data from an information recording medium, wherein the information recording medium is one of an information recording medium (V1) of a version 1 or an information recording medium (V2) of a version 2, and the V1 and the V2 are required for different data processing operations in a reproduction processing operation;

executing a directory name calculation processing in which a conversion function f1, corresponding to the version 1, is applied to configuration data of a first root certificate recorded in the information recording medium (V1), when the information recording medium (V1) of the version 1 is mounted on the information processing device, wherein the conversion function f1 is a hash function h1; and executing the directory name calculation processing in which a conversion function f2, corresponding to the version 2, is applied to configuration data of a second root certificate recorded in the information recording medium (V2), when the information recording medium (V2) of the version 2 is mounted on the information processing device, wherein the conversion function f2 is one of
f2=h1(h1), wherein f2 is obtained by repetition of the hash function h1 twice,
a hash function h2 different from the hash function h1, or
f2=h1||h1, wherein f2 is for calculation of a concatenation value of a calculation value of the hash function h1; and selecting second data corresponding to the information recording medium, as reproduction target data, from a directory having a calculated directory name, wherein the directory is a result of the directory name calculation processing, the directory is in a local storage unit, and the local storage unit is different from the information recording medium.

\* \* \* \* \*